(12) United States Patent
Coffland et al.

(10) Patent No.: US 9,259,865 B2
(45) Date of Patent: Feb. 16, 2016

(54) SEAL MOLDING SYSTEM AND METHOD

(71) Applicant: The Boeing Company, Chicago, IL (US)

(72) Inventors: Donald W. Coffland, Seattle, WA (US); Garrett W. Downing, Everett, WA (US); David T. Nguyen, Renton, WA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 13/845,014

(22) Filed: Mar. 17, 2013

(65) Prior Publication Data

US 2014/0261994 A1    Sep. 18, 2014

(51) Int. Cl.
| | |
|---|---|
| *B29C 33/30* | (2006.01) |
| *B29C 44/14* | (2006.01) |
| *B29C 39/10* | (2006.01) |
| *B29C 45/14* | (2006.01) |
| *B29C 33/00* | (2006.01) |
| *B29L 31/26* | (2006.01) |
| *B29L 23/00* | (2006.01) |
| *B29C 45/34* | (2006.01) |

(52) U.S. Cl.
CPC ............. *B29C 39/10* (2013.01); *B29C 33/005* (2013.01); *B29C 45/14426* (2013.01); *B29C 45/14549* (2013.01); *B29C 45/14598* (2013.01); *B29C 33/30* (2013.01); *B29C 45/34* (2013.01); *B29C 2045/14459* (2013.01); *B29L 2023/00* (2013.01); *B29L 2031/26* (2013.01)

(58) Field of Classification Search
CPC ........ B29C 39/10; B29C 70/78; B29C 70/80; B29C 2045/14459; B29C 33/30; B29C 33/005; B29C 33/202; B29C 45/14426; B29C 45/14549; B29C 45/14598
USPC ............. 264/271.1, 279, 279.1; 425/318, 458
See application file for complete search history.

(56) References Cited

U.S. PATENT DOCUMENTS

| | | | | |
|---|---|---|---|---|
| 2,892,013 | A * | 6/1959 | Gomberg | 174/153 G |
| 3,692,457 | A * | 9/1972 | Pekor | 425/435 |
| 3,798,586 | A * | 3/1974 | Huska | 439/263 |
| 4,090,294 | A * | 5/1978 | Parr | 29/828 |
| 4,134,431 | A | 1/1979 | Davidson et al. | |
| 4,371,145 | A * | 2/1983 | Barnes | 249/80 |
| 4,382,049 | A * | 5/1983 | Hofmeister et al. | 264/263 |
| 4,971,745 | A * | 11/1990 | Ferenc et al. | 264/263 |
| 5,226,837 | A * | 7/1993 | Cinibulk et al. | 439/521 |
| 2005/0211101 | A1 | 9/2005 | Finnie, II | |
| 2010/0310803 | A1 | 12/2010 | Wallace | |
| 2012/0217673 | A1* | 8/2012 | Hutter, III | 264/219 |

FOREIGN PATENT DOCUMENTS

| | | |
|---|---|---|
| DE | 4341064 | 7/1995 |
| DE | 19503346 | 8/1996 |

(Continued)

OTHER PUBLICATIONS

PCT/US2014/016638, International Search Report dated Aug. 4, 2014.

*Primary Examiner* — William Bell

(57) ABSTRACT

A seal molding system may include a mold body having a mold inner geometry formed complementary to a fitting outer geometry of a fitting. The mold body may have a mold base formed complementary to a panel surface. The mold body may include an injection hole for injecting sealant into the mold cavity, and a vent hole for venting air and sealant from the mold cavity.

21 Claims, 22 Drawing Sheets

(56) References Cited

FOREIGN PATENT DOCUMENTS

| DE | 19728234 | 3/1999 |
| DE | 19949471 | 5/2001 |
| GB | 958367 | 5/1964 |
| WO | WO2012150897 | 11/2012 |

\* cited by examiner

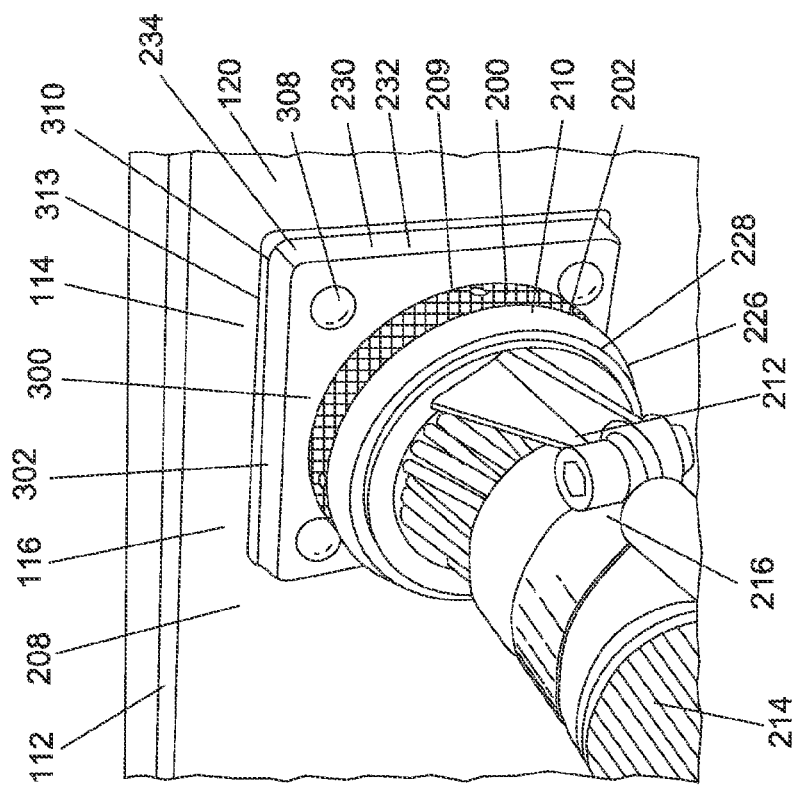
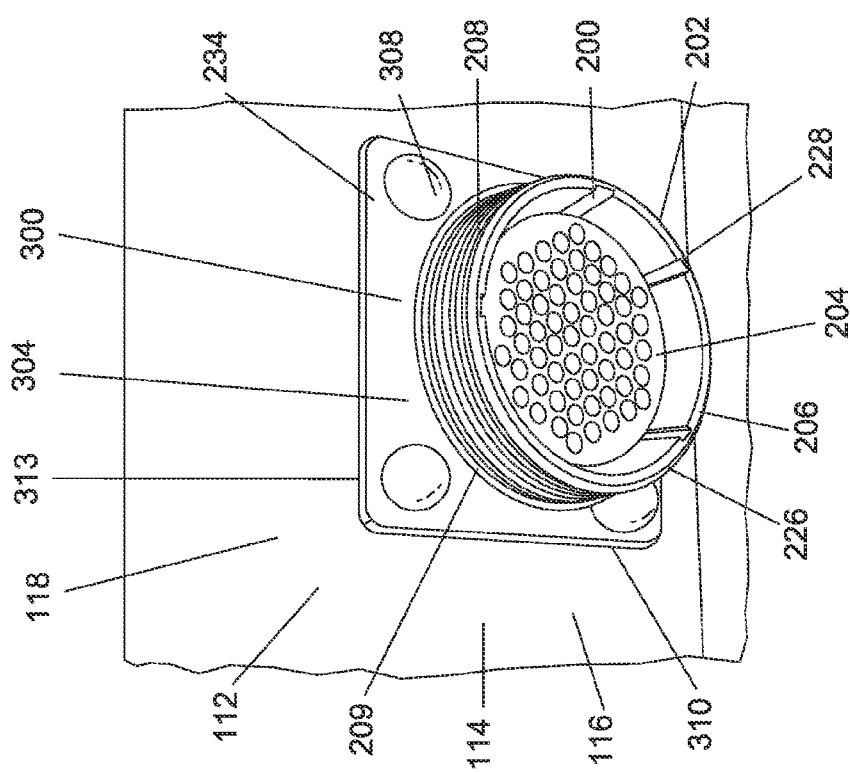

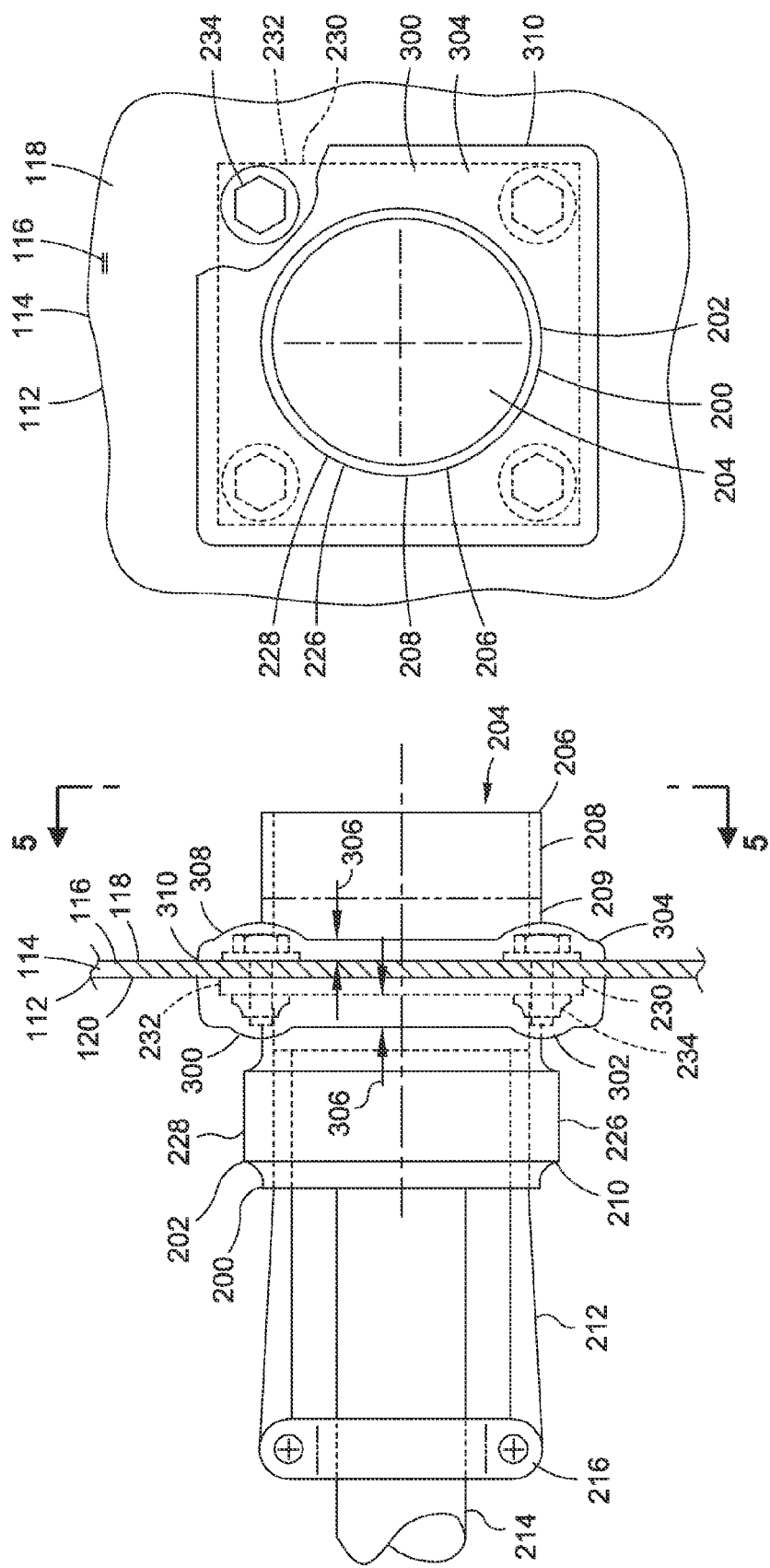

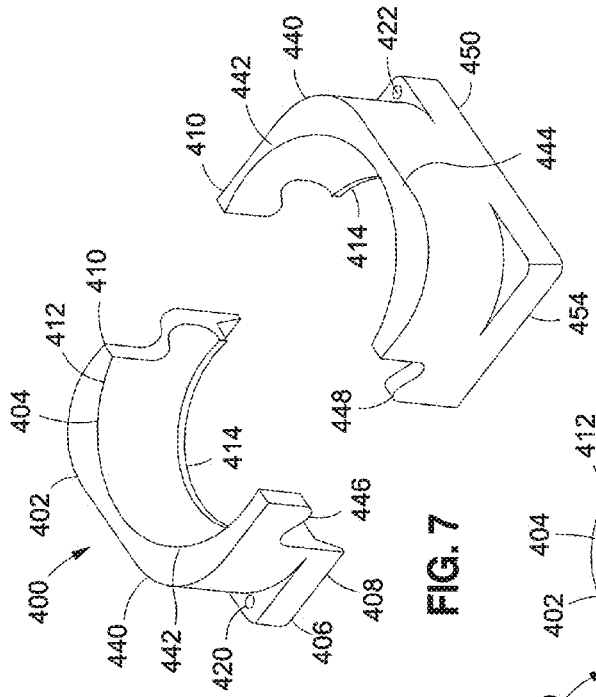
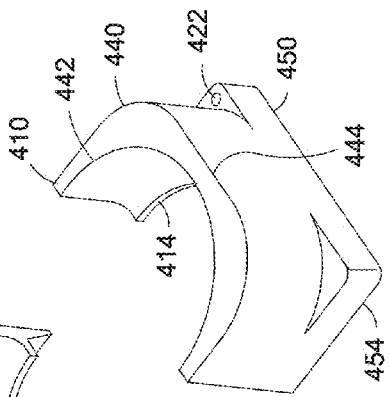
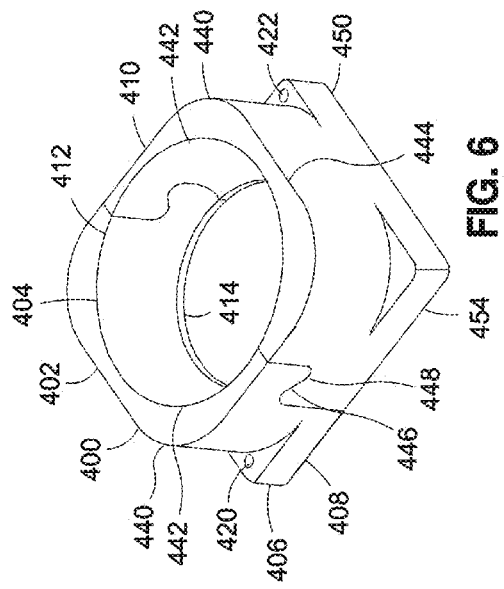
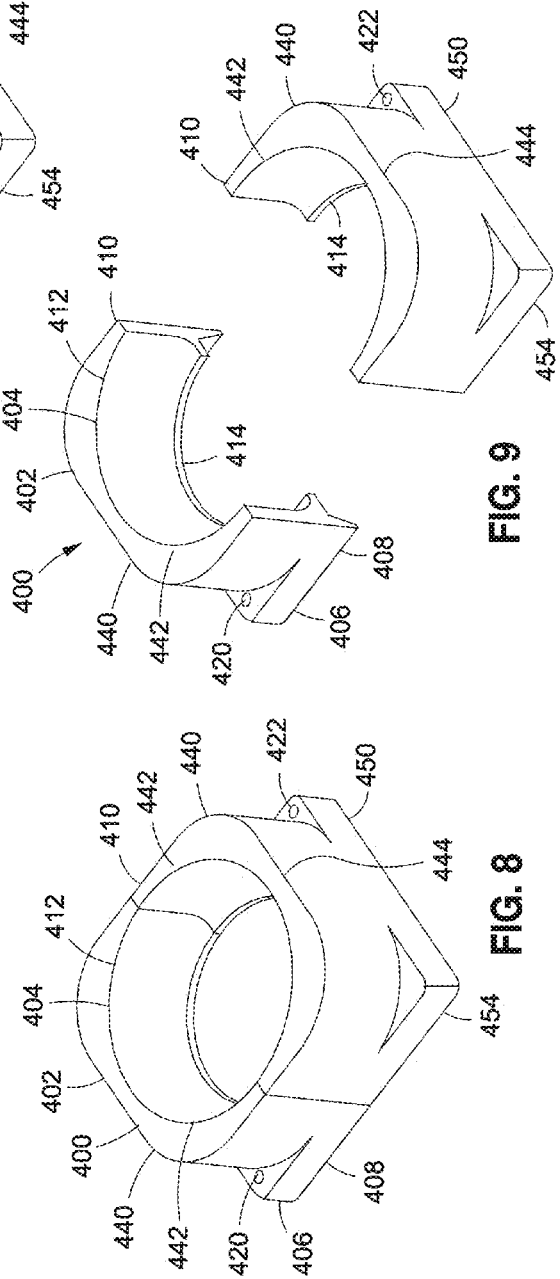

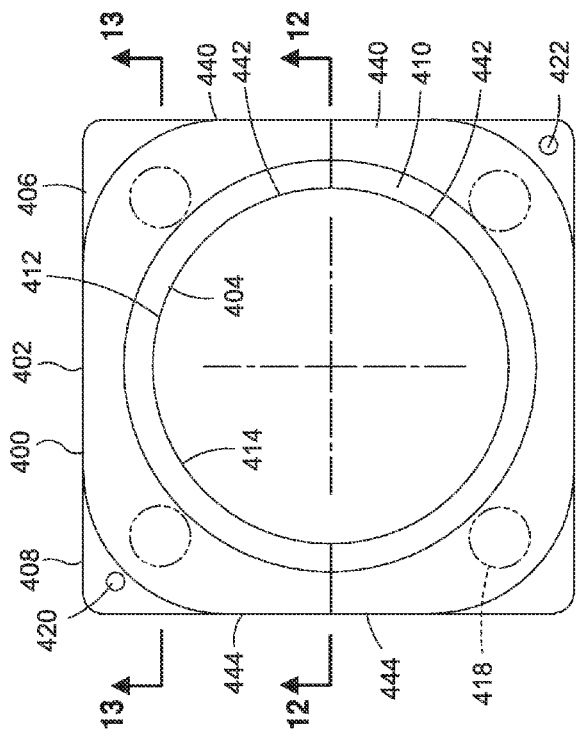
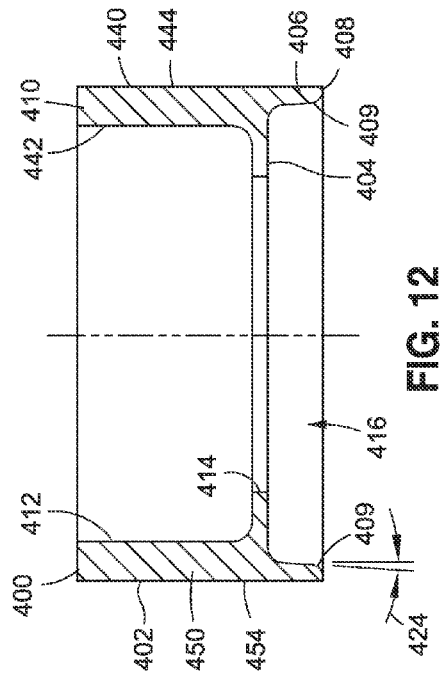
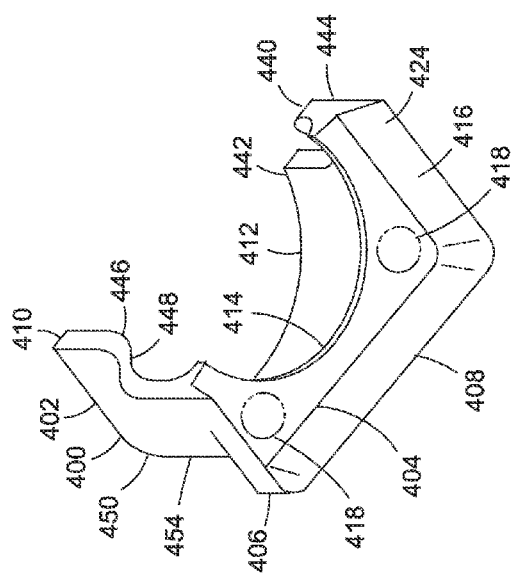
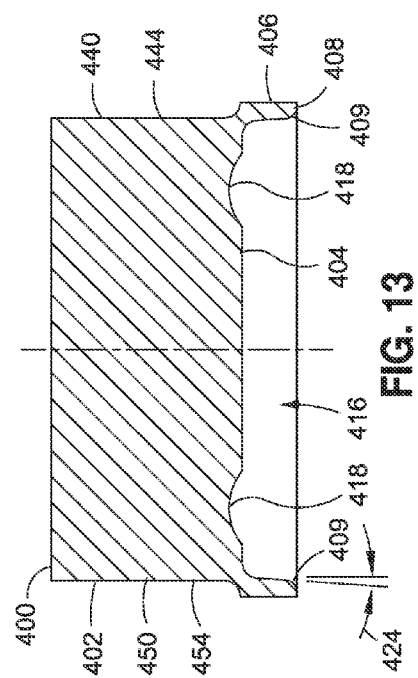

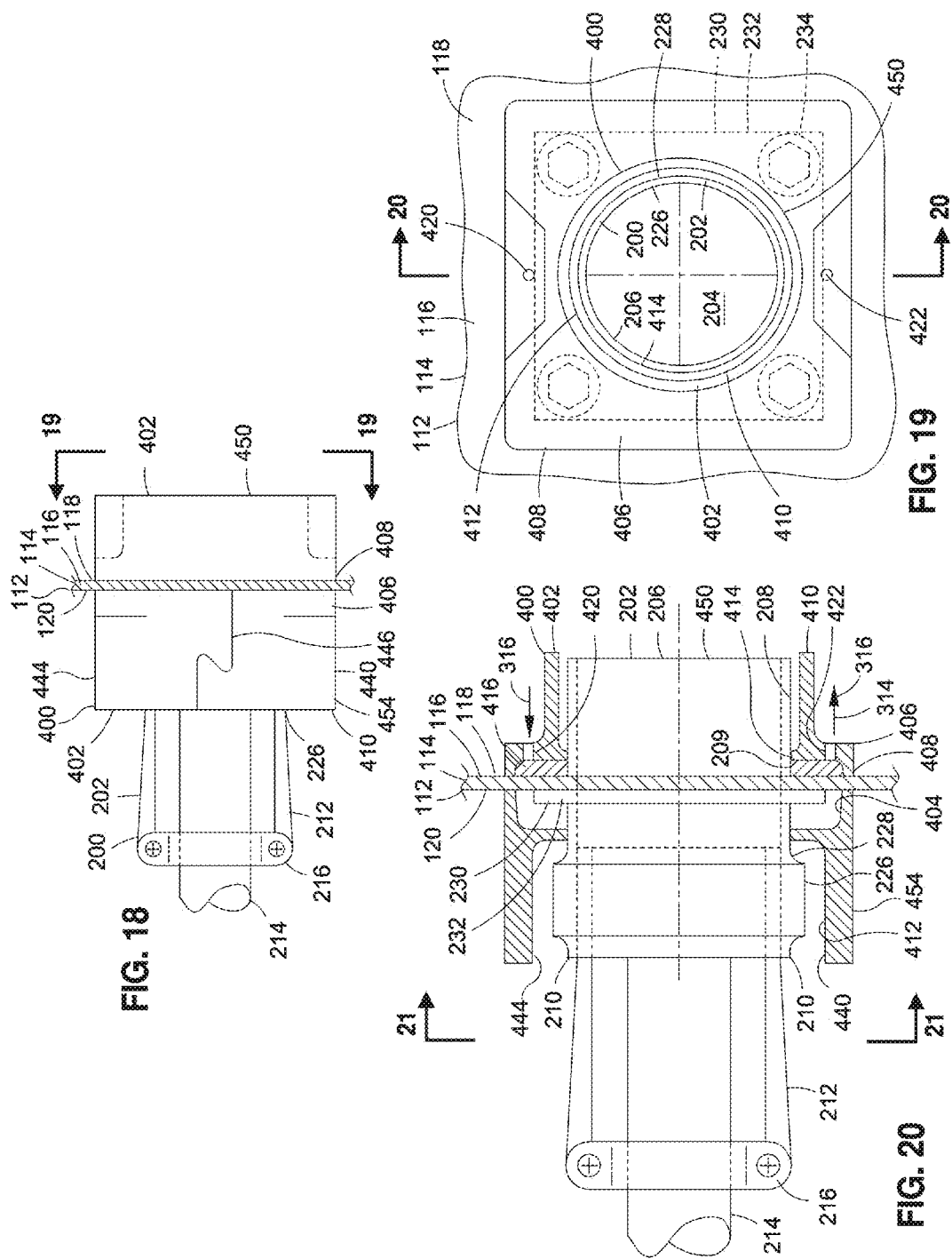

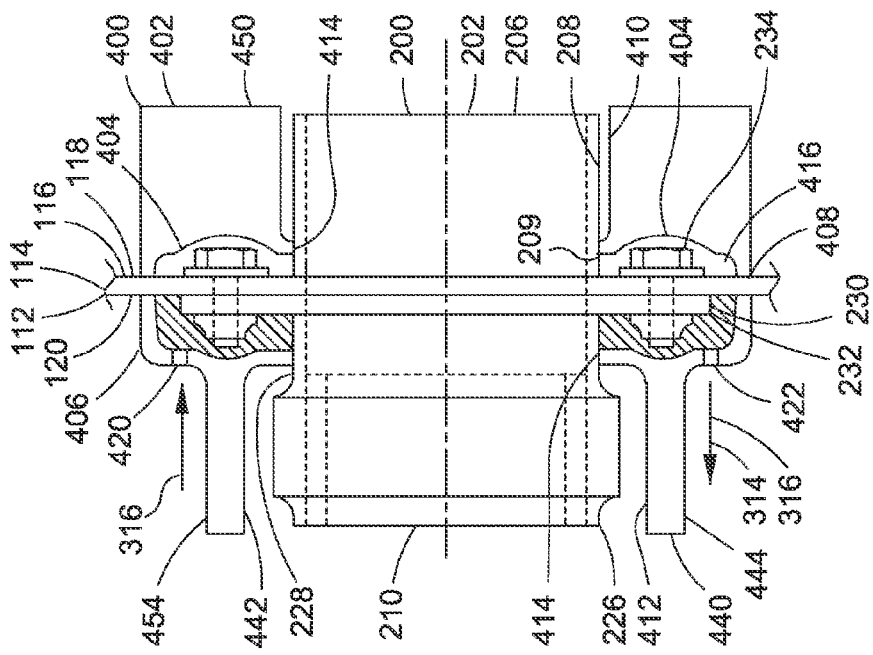
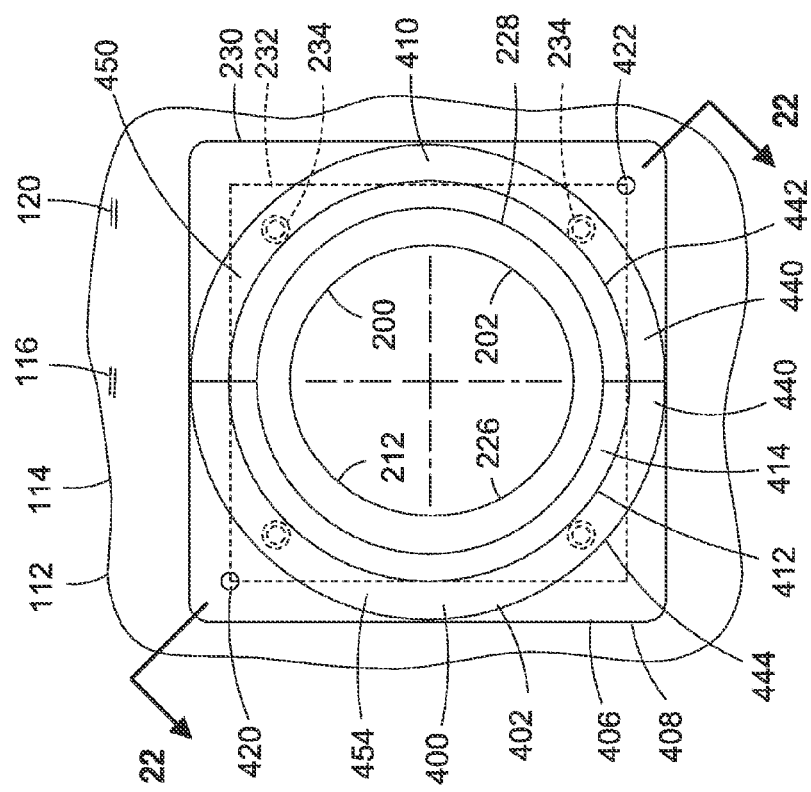

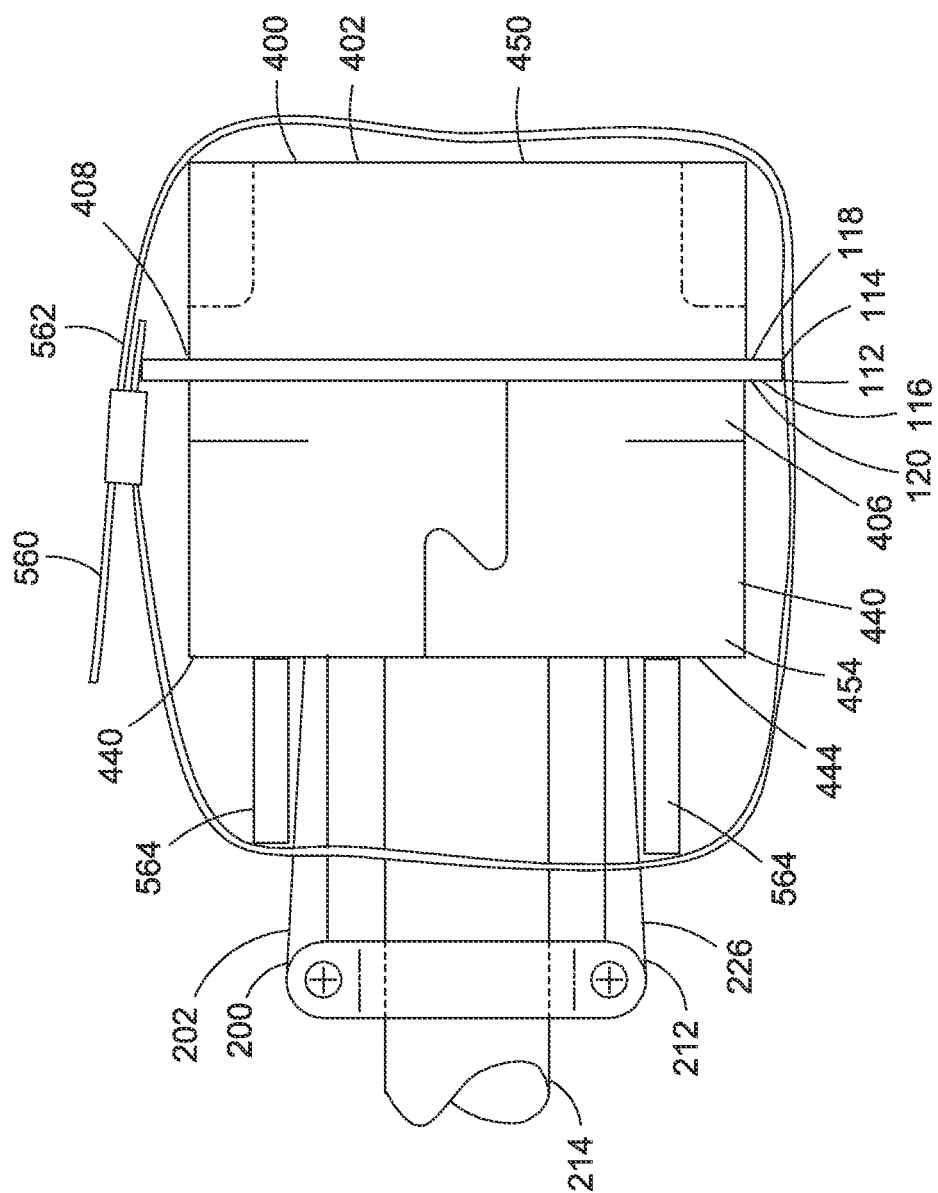

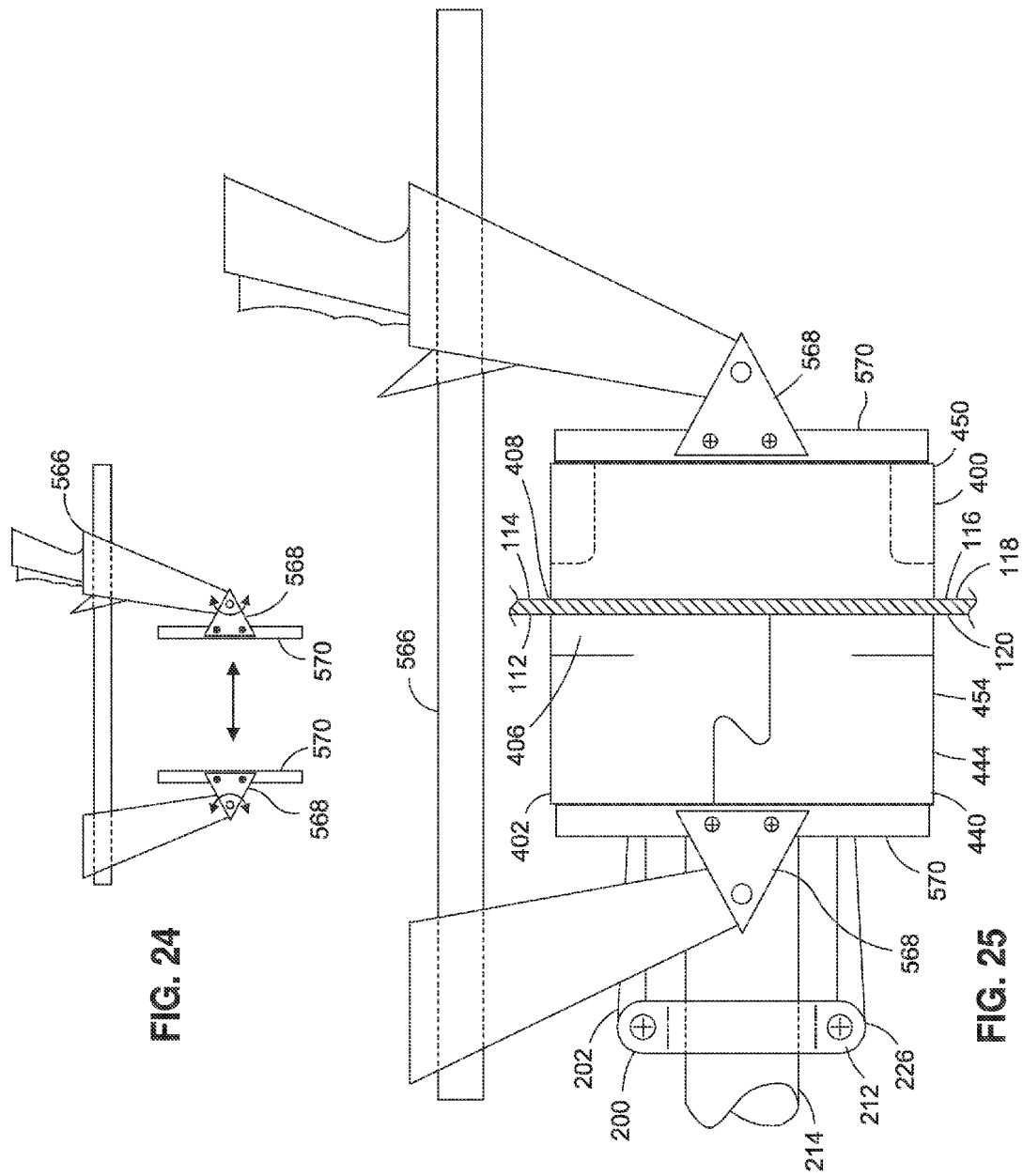

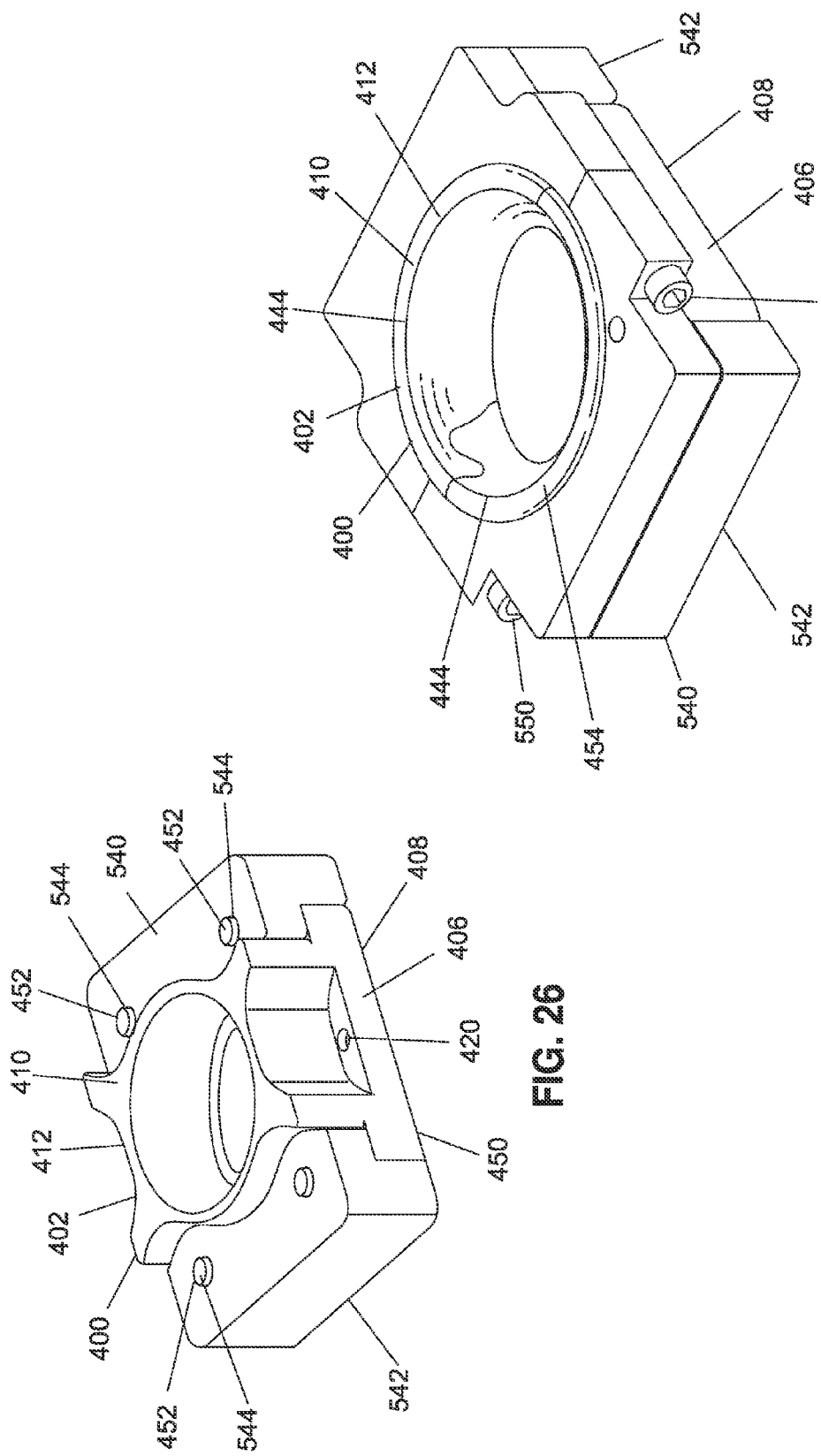

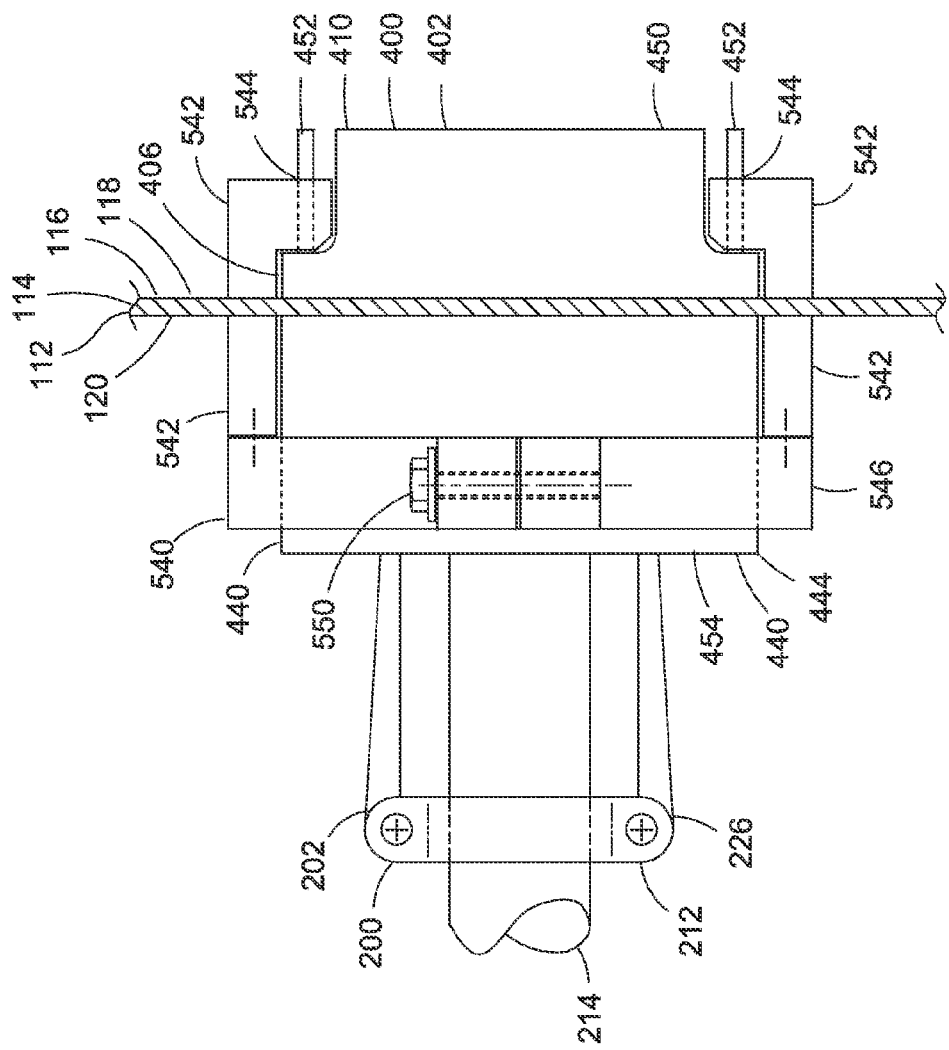

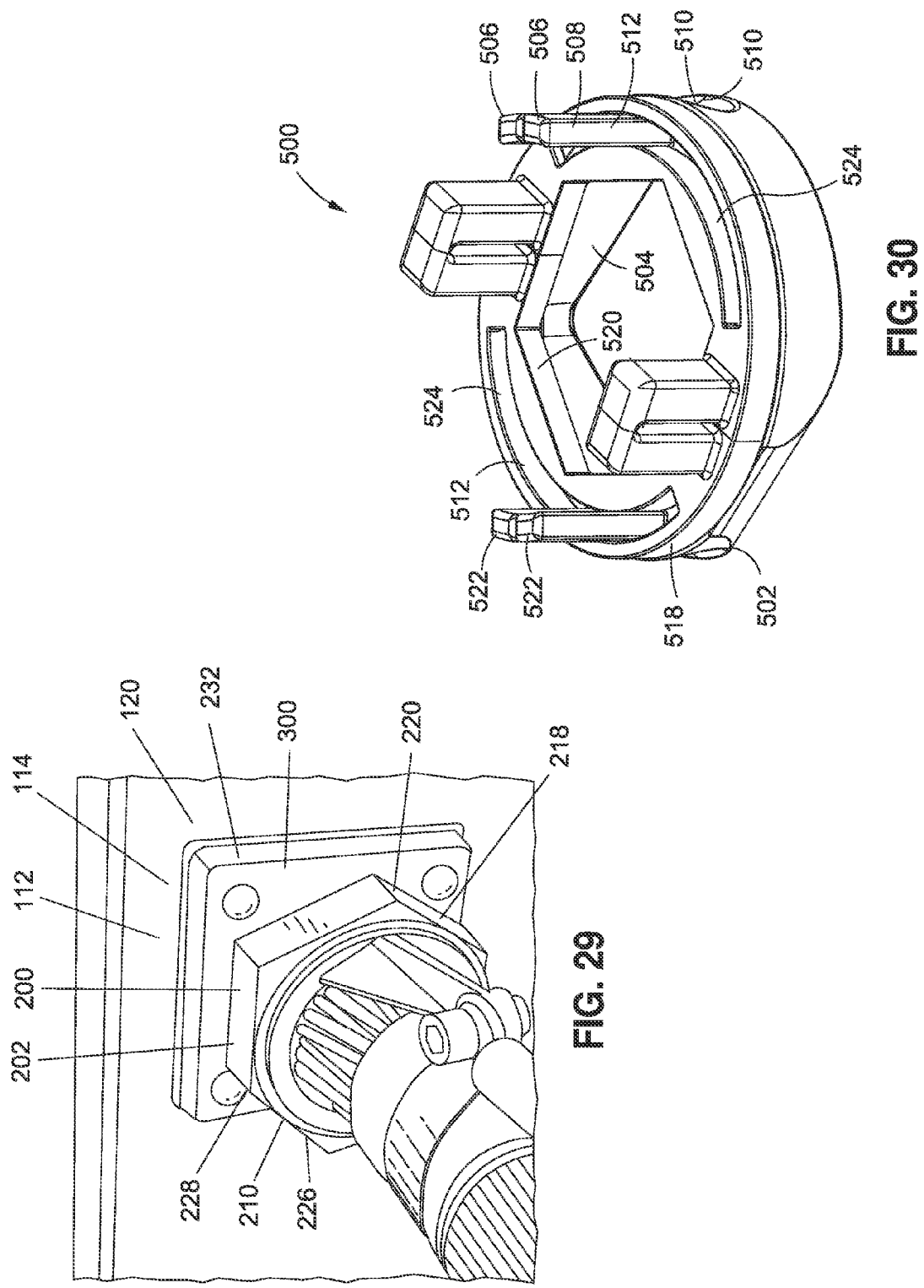

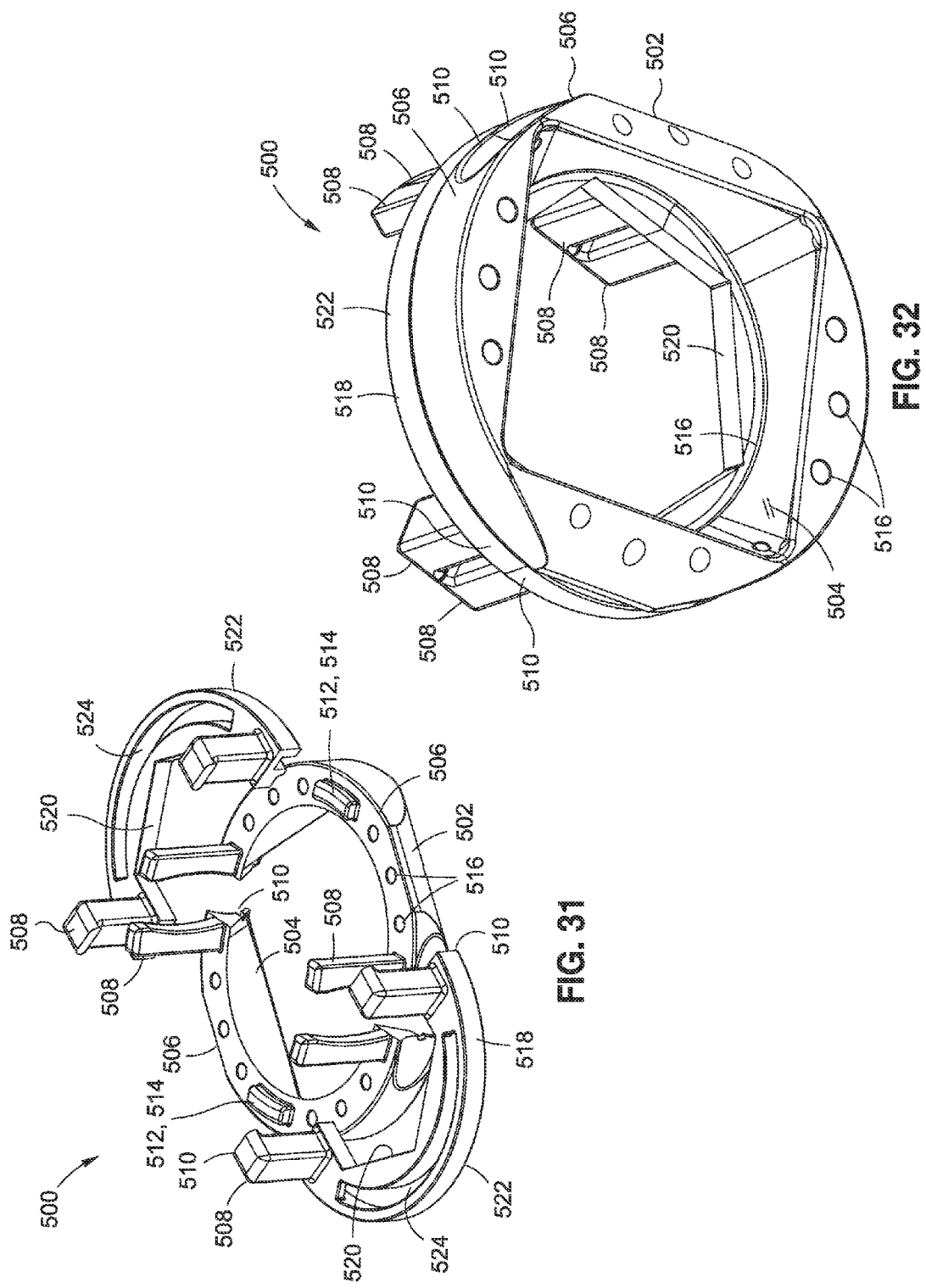

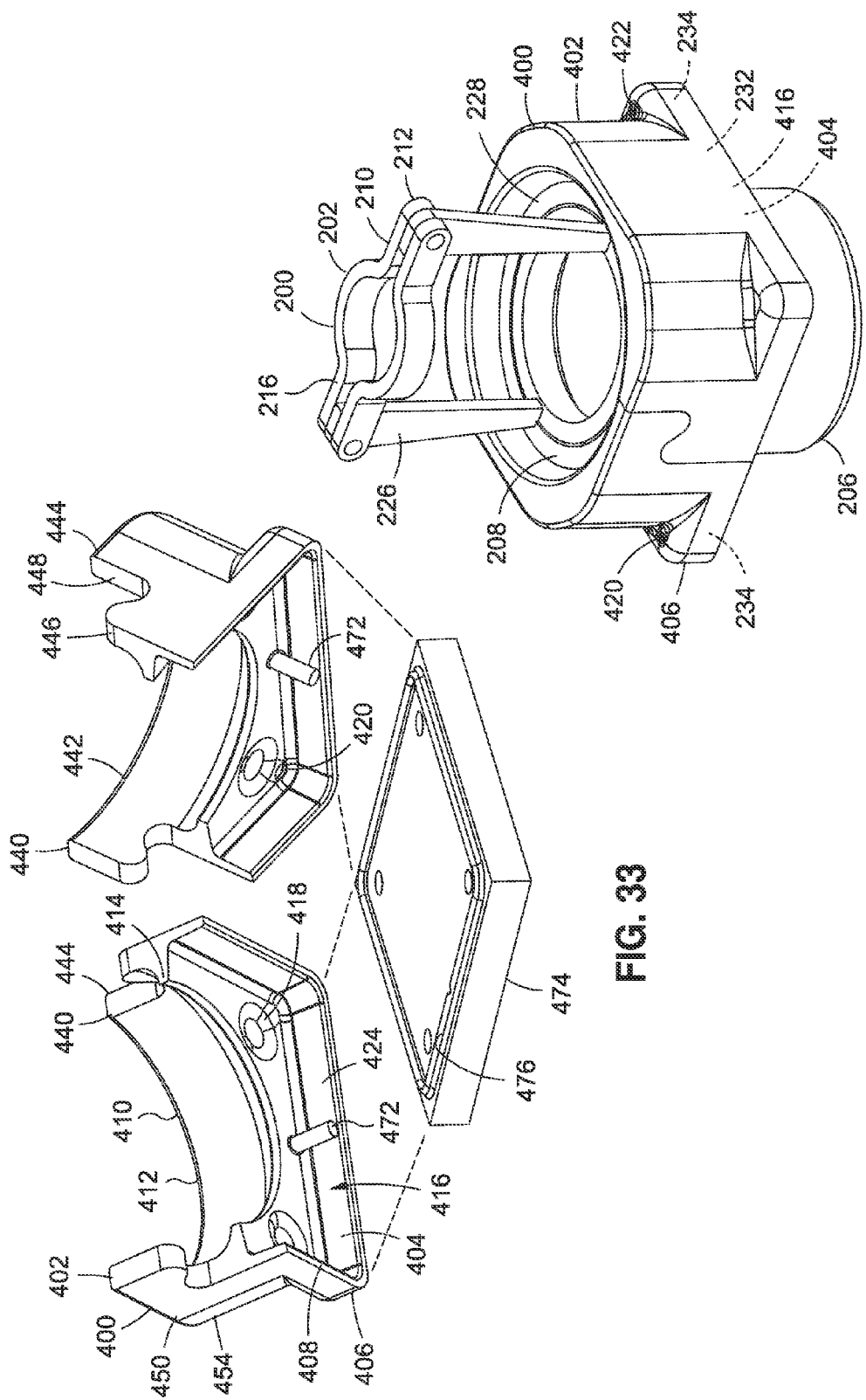

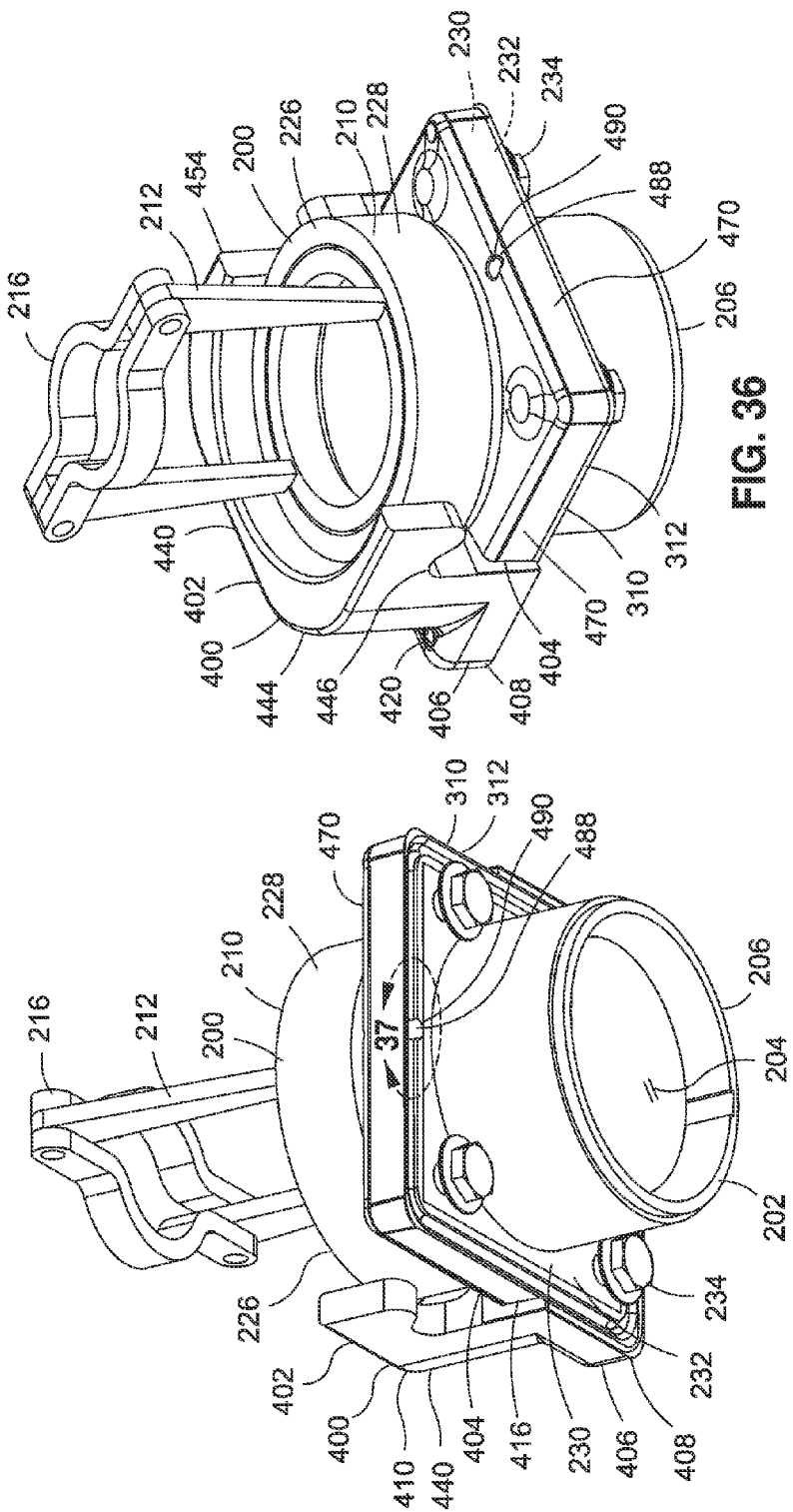
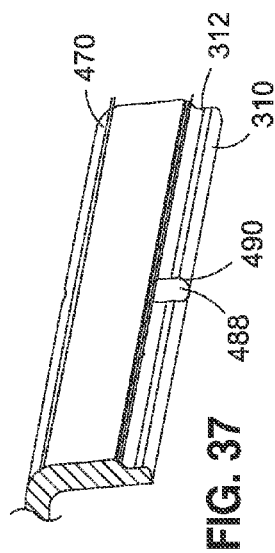

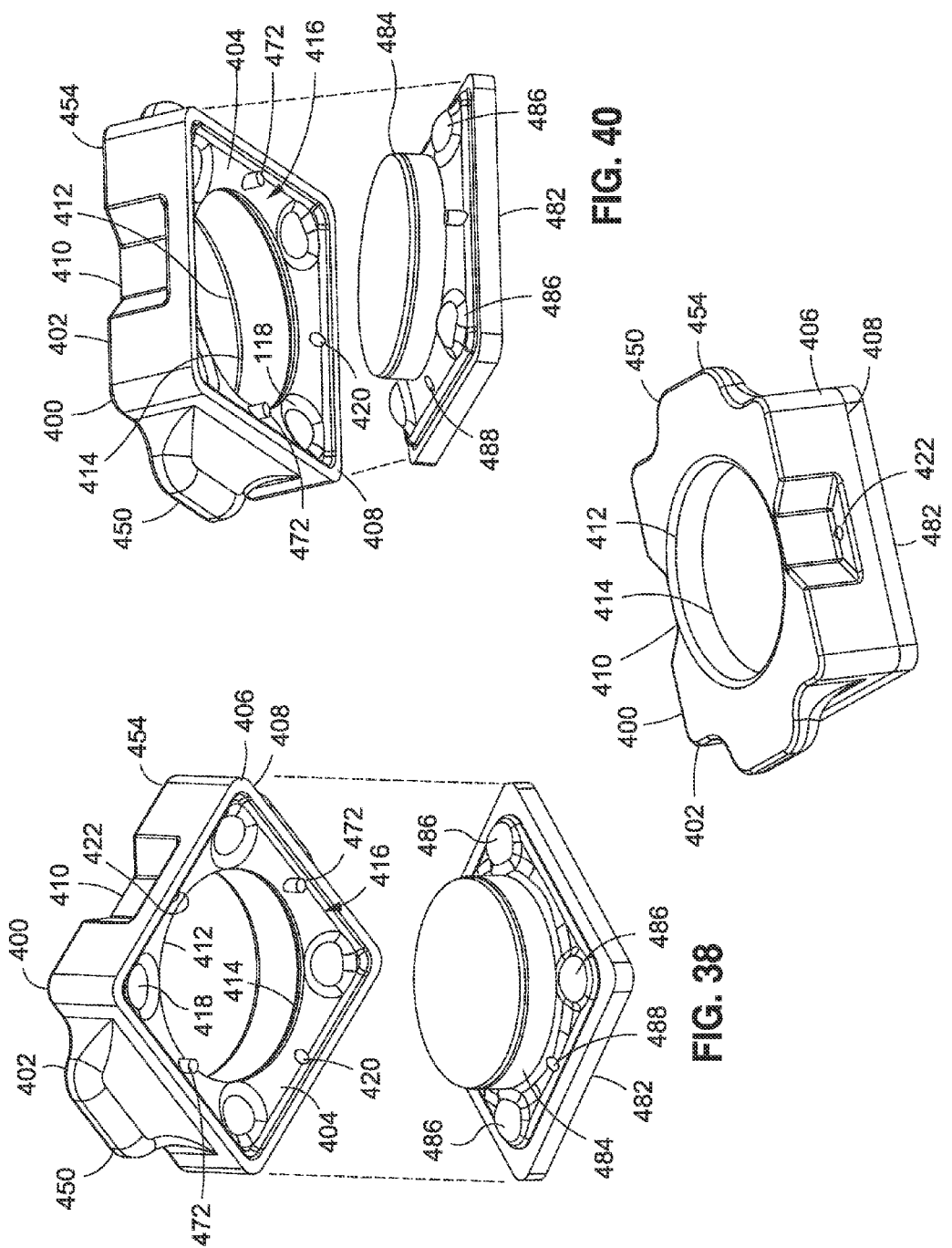

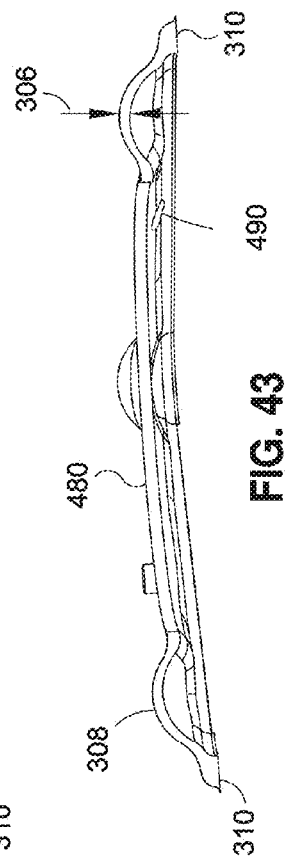
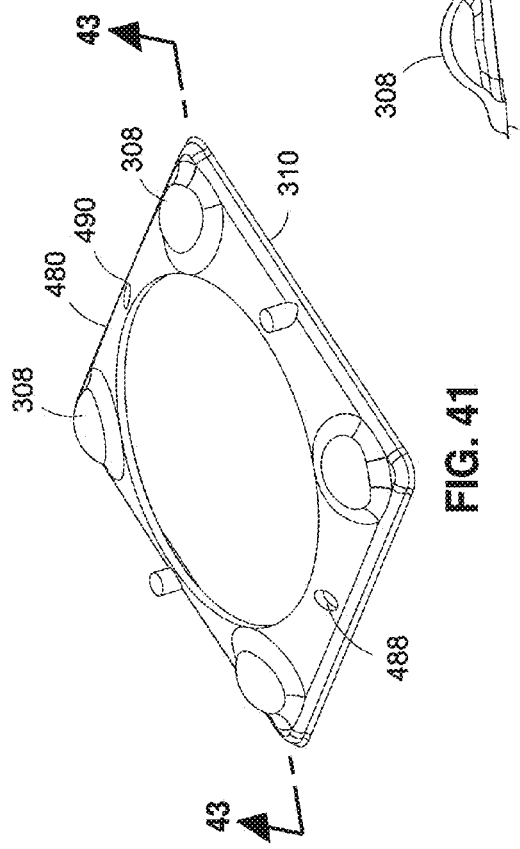
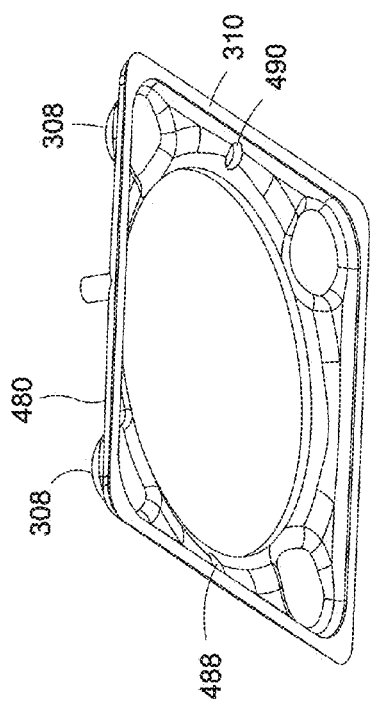

SEAL MOLDING SYSTEM AND METHOD

FIELD

The present disclosure relates generally to the sealing systems and, more particularly, to systems for sealing a fitting mounted to a panel or other member.

BACKGROUND

Electrical connectors are installed at numerous locations throughout an aircraft. An electrical connector may be mounted to a panel or a bulkhead of an aircraft by extending the connector through an aperture formed in the bulkhead. The electrical connector may be secured to the bulkhead by fastening a connector flange to the bulkhead using mechanical fasteners. On certain electrical connector installations, it is necessary to encapsulate the entire connector flange and the mechanical fasteners with a seal to provide a barrier against fluid transfer across the bulkhead, and/or to protect the connector and the bulkhead against corrosion.

Prior art methods of sealing electrical connectors to bulkheads include the manual application of sealant around the connector flange and around the mechanical fasteners using hand implements. Unfortunately, manual application of sealant is a laborious and time-consuming process which produces inconsistent results at different connector installations. In addition, manual application of sealant may result in a generally rough surface finish which may lead to a reduction in perceived product quality and/or actual product quality. Furthermore, if it is determined that the surface finish has the propensity to retain moisture due to curls, voids, or other surface features, it may be necessary to rework or remove the seal, and manually re-apply sealant which may have a negative impact on the process flow.

As can be seen, there exists a need in the art for a system and method of forming a seal over a connector flange in a time-efficient manner. In addition, there exists a need in the art for a system and method of forming a seal which provides a high-quality and smooth surface finish that can be consistently produced at multiple connector installations.

SUMMARY

The above-noted needs associated with seal forming are specifically addressed and alleviated by the present disclosure which provides a seal molding system including a mold body having a mold inner geometry formed complementary to a fitting outer geometry of a fitting. The mold body may have a mold base formed complementary to a panel surface. The mold body may include an injection hole for injecting sealant into the mold cavity, and a vent hole for venting air and sealant from the mold cavity.

In a further embodiment, disclosed is seal molding system including a mold body having a mold inner geometry and a mold bore formed complementary to a fitting outer geometry of an electrical connector. The mold body may have a mold base formed complementary to a fitting flange and a panel surface. The mold body may include an injection hole for injecting sealant into a mold cavity defined at least partially by the mold inner geometry and the fitting outer geometry. The mold body may further include a vent hole for venting air and sealant from the mold cavity.

Also disclosed is a method of forming a seal around a fitting mounted to a panel. The method may include the step of providing a mold body having a mold inner geometry formed complementary to a fitting outer geometry of a fitting mounted to a panel. The method may additionally include mounting the mold body over the fitting, and injecting sealant into an injection hole formed in the mold body until the sealant substantially fills a mold cavity enclosed by the mold inner geometry and the fitting outer geometry. The sealant may be allowed to cure, after which the mold body may be removed from the fitting.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a perspective illustration of the front side of an electrical connector installation in a bulkhead of the aircraft;

FIG. 3 is a perspective illustration of the back side of an electrical connector installation in the aircraft bulkhead;

FIG. 4 is a side view of a fitting (e.g., an electrical connector) mounted to a panel and encapsulated by a seal;

FIG. 5 is an end view of the fitting installation of FIG. 4 illustrating the seal encapsulating the mechanical fasteners that secure the fitting flange to the panel;

FIG. 6 is a perspective illustration of an embodiment of a mold body comprised of a pair of mold body halves formed in mirror-image to one another for forming a seal on the back side of the fitting installation;

FIG. 7 is a exploded perspective illustration of the mold body of FIG. 6 and illustrating an interlocking feature for coupling the mold body halves together;

FIG. 8 is a perspective illustration of a further embodiment of a mold body comprised of a pair of mold body halves;

FIG. 9 is a exploded perspective illustration of the mold body of FIG. 8 and illustrating the relatively straight sides of the mold body halves;

FIG. 10 is a perspective illustration of an underside of one of the mold body halves shown in FIG. 7;

FIG. 11 is a top view of a mold body comprising an assembled pair of mold body halves;

FIG. 12 is a sectional view of the mold body taken along line 12 of FIG. 11;

FIG. 13 is a sectional view of the mold body taken along line 13 of FIG. 11;

FIG. 18 is a side view of a front side mold and a backshell mold assembly mated to a fitting installation;

FIG. 19 is an end view of the front side mold taken along line 19 of FIG. 18 and illustrating the front side mold mounted to the fitting and the panel;

FIG. 20 is a sectional view of the front side mold and the backshell mold assembly taken along line 20 of FIG. 19 and illustrating the injection of sealant into an injection hole and the discharge of air from a vent hole formed in the front side mold;

FIG. 21 is an end view of the backshell mold assembly taken along line 21 of FIG. 20 and illustrating the backshell mold assembly mounted to the fitting and the panel;

FIG. 22 is a sectional view of the backshell mold assembly taken along line 22 of FIG. 21 and illustrating the injection of sealant into an injection hole and the discharge of air from a vent hole formed in the backshell mold assembly;

FIG. 23 is a side view of the front side mold and the backshell mold assembly clamped together using a tie wrap;

FIG. 24 is a side view of an embodiment of a clamping mechanism for clamping the front side mold and the backshell mold assembly to the panel;

FIG. 25 is a side view of an embodiment of the clamping mechanism of FIG. 24 in operation;

FIG. 26 is a perspective illustration of an embodiment of a pair of magnets mounted on opposing sides of the front side mold;

FIG. 27 is a perspective illustration of an embodiment of a pair of magnets mounted on opposing sides of the backshell mold assembly;

FIG. 28 is a side view of the front side mold and the backshell mold assembly magnetically coupled together using the magnets illustrated in FIGS. 26-27;

FIG. 29 is a perspective illustration of an embodiment of the fitting (e.g., an electrical connector) having a rotatable hex nut threadably coupled to the fitting and the application of the seal encapsulating the fitting flange and the rotatable hex nut;

FIG. 30 is a perspective illustration of an embodiment of the mold body having a rotatably adjustable top portion coupled to a fixed base portion;

FIG. 31 is an exploded perspective illustration of the rotatably adjustable top portion made up of a pair of top portion halves, and the fixed base portion made up of a pair of base portion halves;

FIG. 32 is a perspective illustration of the mold body configuration of FIG. 30 and illustrating the fixed base portion having a contour shaped complementary to the contour of a panel to which the base portion may be mounted;

FIG. 33 is an exploded perspective illustration of an embodiment of a mold body and a bottom plate for forming a preformed seal;

FIG. 34 is a perspective illustration of the mold body and the bottom plate assembled around a fitting (e.g., an electrical connector) prior to the injection of sealant into an injection hole in the mold body;

FIG. 35 is a perspective illustration of an underside of the bottom plate with one of the mold body halves removed to expose the preformed seal;

FIG. 36 is a further perspective illustration of a top side of the preformed seal prior to removal of the mold body and bottom plate from the fitting;

FIG. 37 is an illustration of an injection port formed in the preformed seal using a port-forming post of the mold body;

FIG. 38 is an exploded perspective illustration of an embodiment of a mold body and a seal skin lower plate configured for forming a seal skin;

FIG. 39 is a perspective illustration of the mold body mated to the seal skin bottom plate to enclose a mold cavity for forming the seal skin;

FIG. 40 is an exploded perspective illustration of the mold body removed from the seal skin lower plate to expose the seal skin after curing thereof;

FIG. 41 is a perspective illustration of a top side of the seal skin formed using the mold body and seal skin bottom plate shown in FIG. 40;

FIG. 42 is a perspective illustration of an underside of the seal skin of FIG. 41;

FIG. 43 is a cross-sectional illustration of the seal skin illustrating a wall thickness thereof;

DETAILED DESCRIPTION

Figure 1:
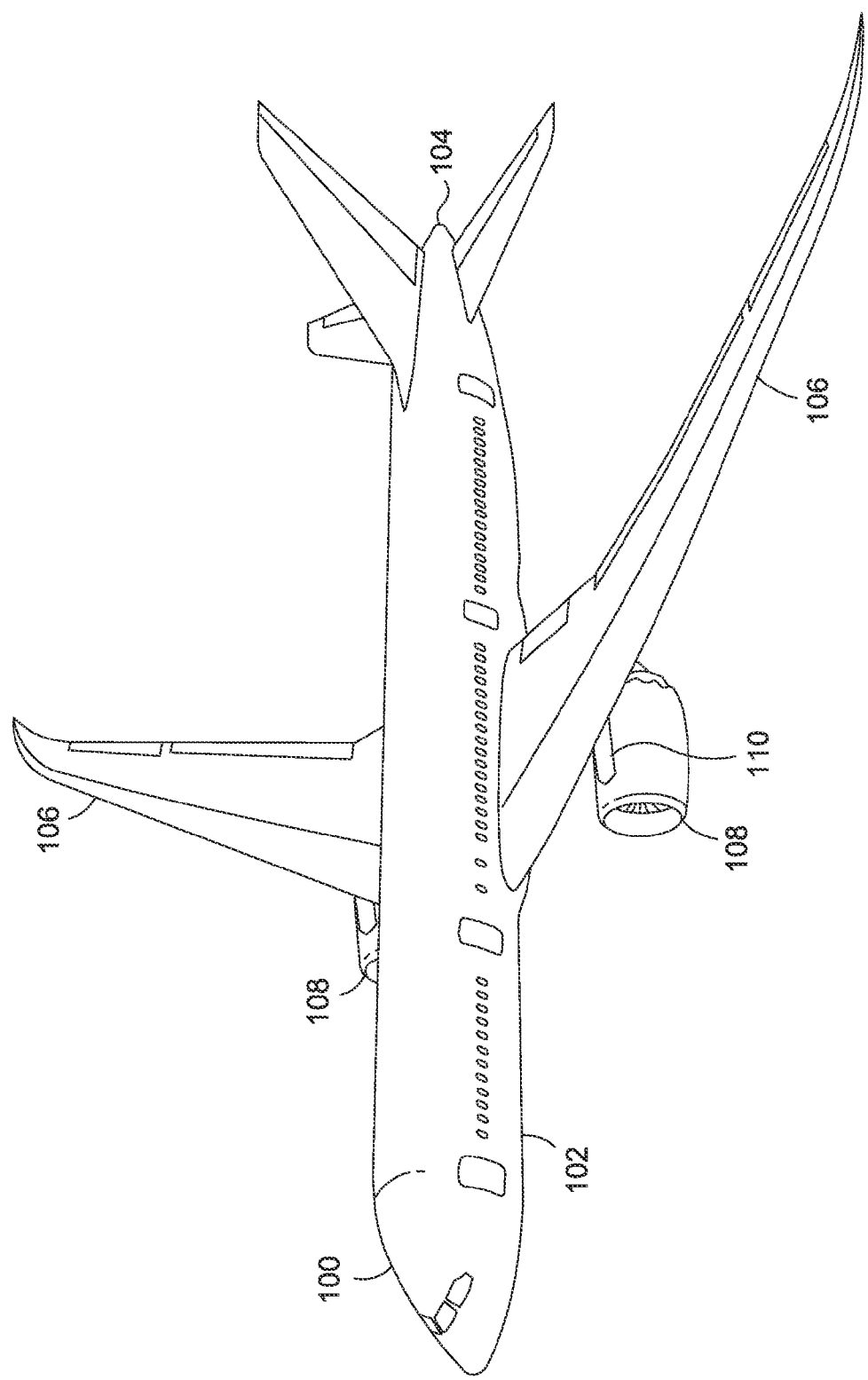
FIG. 1 is a perspective illustration of an aircraft.

Referring now to the drawings wherein the showings are for purposes of illustrating preferred and various embodiments of the disclosure, shown in FIG. 1 is a perspective view of an aircraft 100 having a fuselage 102 extending from a forward end of the aircraft 100 to an aft end of the aircraft 100. The aft end may include an empennage 104 having one or more tail surfaces for directional control of the aircraft 100. The aircraft 100 may further include a pair of wings 106 extending outwardly from the fuselage 102 and one or more propulsion units 108 that may be mounted to the wings 106 using pylons or struts 110.

FIG. 2 illustrates a fitting 200 installation (e.g., an electrical connector 202 installation) in a panel 114 (e.g., a bulkhead 112) of an aircraft 100. The panel 114 may include an aperture or hole (not shown) for extending a front portion 206 of the fitting 200 through the hole. The fitting 200 may be secured to the panel 114 by means of a fitting flange 232 which may be mountable against the panel 114 using a plurality of flange fasteners 234. The front portion 206 of the fitting 200 may house a connector plug 204 for coupling with a mating connector (not shown). In an embodiment, the front portion 206 of the fitting 200 may have a threaded portion 208 for threadably receiving the mating connector. The fitting 200 may also have a non-threaded portion 209 located between the threaded portion 208 and the panel 114.

In FIG. 2, the fitting 200, the fitting flange 232, the flange fasteners 234, and the adjacent panel surface 116 may advantageously be encapsulated with a high-quality, form-fitting, seal 300. The seal 300 may advantageously be molded in place and provided with a smooth surface finish using the labor-saving system and method disclosed herein. The seal molding system 400 may use one or more mold bodies 402 that may be clamped in place around the fitting 200 and against the panel surfaces 116. Sealant 316 may be injected into an injection hole 420 formed in the mold bodies 402 such as by using a sealant gun (not shown). Sealant 316 may be continuously injected into the mold cavity 416 until the sealant 316 flows out of a vent hole 422 that may be located on an opposite side of the mold body 402. The sealant 316 may be allowed to cure after which the mold bodies 402 may be removed to expose the seal 300. Flashing (not shown) may be removed from the seal 300 such as by using a scraper (not shown).

Advantageously, the seal molding system 400 and method disclosed herein provides a significant savings in labor for sealing panel-mounted fittings relative to the amount of labor associated with manual sealing methods. For example, the seal molding system 400 may provide a labor savings of greater than 90% relative to manual systems of sealing a fitting 200 to a panel 114. In addition, the seal molding system 400 and method provides a significant improvement in real and perceived product quality relative to manual sealing methods. For example, the seal molding system 400 provides a seal 300 with a smooth surface finish that may be consistently reproduced at multiple fitting installations, and represents a significant improvement relative to the surface finish provided by manual methods. The seal molding system 400 may also be used to mold a seal 300 around penetrations (not shown) in a panel such penetrations for a tube fitting (not shown) and/or in locations where an element or an object (not shown) penetrates a bulkhead or panel without a fitting. For example, the seal molding system 400 may be implemented for molding a seal (not shown) around a penetration (not shown) of one or more wire bundles (not shown) through a pressure bulkhead without a fitting at that penetration. A grommet (not shown) may be installed at such locations. The seal molding system 400 may be assembled around the wire bundle to inject sealant around the wire bundle and in between individual wires (not shown) to create a seal.

FIG. 3 shows the back side 120 of the fitting 200 installation of FIG. 2. In the embodiment shown, the fitting 200 may include a backshell 212 for providing strain relief for a cable or a wire bundle 214 extending from the connector plug 204 housed within the fitting 200. The backshell 212 may include a cable clamp 216 for fixedly positioning the wire bundle 214 relative to the fitting 200. The fitting 200 may include a fitting flange 232 that may be mounted against the panel front side 118 or panel back side 120. The fitting flange 232 may be mounted to the panel 114 using flange fasteners 234 which may be encapsulated by the seal 300. The fitting flange 232 may also be encapsulated by the seal 300 which may circumscribe the fitting body 226 and seal against the panel surface 116.

FIG. 4 is a side view of an embodiment of a fitting 200 mounted to a panel 114. The front side seal 304 encapsulates the portion of the fitting body 226 adjacent the panel 114, the heads of the flange fasteners 234 securing the fitting flange 232 to the back side 120 of the panel 114, and the panel surface 116 in the area adjacent to the flange fasteners 234. The backshell seal 302 also encapsulates the portion of the fitting body 226 adjacent the panel 114, the fitting flange 232, the protruding ends of the flange fasteners 234, and the panel surface 116 in the area adjacent to the flange fasteners 234. The seal molding system 400 and method disclosed herein advantageously provides a means for controlling the wall thickness 306 of the seals 300, and also provides a means for controlling the amount of overlap of each seal 300 on the panel surface 116 on the front side 118 and back side 120 of the panel 114.

FIG. 5 is an end view of the fitting 200 installation of FIG. 4 showing the perimeter of the front side seal 304. The front side seal 304 may be configured to encompass one or more of the flange fasteners 234. Although the seal 300 perimeter is shown having a square shape or orthogonal shape, the seal forming system 400 and method disclosed herein may be sized and configured such that the seal 300 on the front side 118 or back side 120 may be provided in any size, shape, and configuration, without limitation, and is not limited to the configurations shown in the Figures. For example, the mold bodies 402 employed in the seal forming system 400 may be configured to form a seal 300 with a perimeter having a circular shape, or any other shape.

FIGS. 6-9 illustrate embodiments of a mold body 402 comprised of a plurality of mold body portions 440 configured to be assembled around the fitting 200. The mold body portions 440 may be used for forming a seal 300 around a fitting 200 where it is not possible or desirable to install a unitary mold body 402 around the fitting 200. In the embodiment shown, the mold body 402 comprises a pair of mold body halves 444. The mold body halves 444 are shown forming a backshell mold assembly 454 configured to be assembled around the fitting 200 on a back side 120 of the panel 114. In an embodiment, the mold body halves 444 of the backshell mold assembly 454 may be formed as mirror images of one another to simplify manufacturing as described below.

In FIGS. 6-7, the mold body portions 440 are shown as mold body halves 444 and may include interlocking features 446 for coupling the mold body portions 440 together when assembled around the fitting 200. The interlocking features 446 may be formed or molded onto the circumferential ends of each one of the mold body portions 440. In the arrangement shown, the interlocking features 446 may comprise a tab and pocket 448 arrangement. The tab and pocket 448 arrangement may be formed on opposite circumferential ends of each mold body half 444 as mirror images of one another. Alternatively, FIGS. 8-9 illustrate mirror-image mold body portions 440 formed without interlocking features 446.

FIGS. 10-12 illustrate the mold inner geometry 404 of the mold body 402. FIG. 10 illustrates an underside of one of the mold body halves 444 showing the mold inner geometry 404 of the mold base 406. The mold inner geometry 404 may include a plurality of depressions 418 for accommodating the flange fasteners 234. FIG. 11 is a top view of the assembled mold body portions 440 the illustrating the arrangement of the depressions 418. Also shown are the injection hole 420 and vent hole 422 which may be formed on opposite sides of the assembled mold body 402. The injection hole 420 may receive sealant 316 into the mold cavity 416. The vent hole 422 may allow air 314 and excess sealant 316 to escape from the mold cavity 416 as described below.

FIG. 12 is a sectional view of the assembled mold body 402 and the arrangement of the depressions 418. Also shown is the arrangement of the injection hole 420 on one side of the mold body 402 and the vent hole 422 on an opposite side of a mold body 402 which may promote the flow of sealant 316 (FIG. 20) from one side of the mold cavity 416 to an opposite side of the mold cavity 416 to substantially force air 314 out of the mold cavity 416 and completely fill the mold cavity 416 with sealant 316. Such an arrangement of the injection hole 420 and the vent hole 422 may eliminate the occurrence of voids or air pockets in the cured seal 300. However, the injection hole 420 and the vent hole 422 may be located at any position relative to one another on the mold body 402, and are not limited to being located on opposite sides of the mold body 402. Furthermore, the mold body 402 is not limited to a single injection hole 420 and a single vent hole 422, and may include any number of injection holes 420 and vent holes 422.

In FIG. 12, the mold body 402 may include a mold base 406 having a perimeter edge 408 that mates with the panel surface 116. The perimeter edge 409 may be provided with an edge radius 409 on the mold inner geometry 404 of the mold body 402. The edge radius 409 may form a seal fillet 313 (FIGS. 2-3) around a perimeter edge 310 of the seal 300 as shown in FIGS. 2-3. The seal fillet 313 may advantageously increase the amount of surface area of the seal perimeter edge 310 in contact with the panel surface 116 and which may improve the integrity and sealing capability of the seal 300.

FIG. 13 is a sectional view of the assembled mold body 402 and an arrangement of the mold inner geometry 404. In any of the embodiments disclosed herein, the mold body 402 may include a mold flange 410 configured to extend around the fitting body 226. The mold flange 410 may define a mold bore 412 that may be formed complementary to the fitting outer geometry 228 of the fitting 200. For mold bodies formed as an assembly of multiple mold body portions 440, each one of the mold body portions 440 may have a bore portion 442. When assembled, the bore portions 442 may define the mold bore 412 which may be sized and configured complementary to the fitting body 226.

In any of the mold body 402 embodiments disclosed herein, the mold bore 412 may optionally include a radial lip 414 for sealing against the sides of the fitting body 226. The mold body 402 in any embodiment disclosed herein may also include a mold base 406 that may be formed complementary to the panel surface 116. For example, the mold base 406 may have a generally planar configuration for sealing engagement with a generally planar panel surface 116. However, the mold base 406 may have a curved or contoured (not shown) configuration for sealing engagement with a curved or contoured panel surface (not shown). The mold body 402 may also include a draft angle 424 on the side walls of a mold cavity 416 to assist in the removal of the mold body 402 from the seal 300 after curing of the seal 300.

Figure 14:
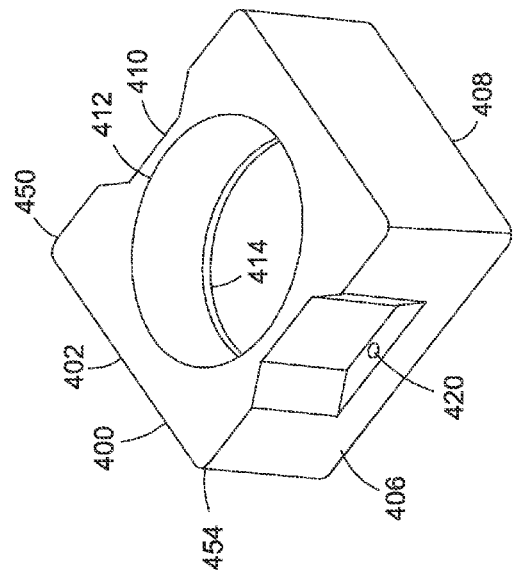
FIG. 14 is a perspective illustration of an embodiment of a mold body formed as a unitary structure.

FIG. 14 shows an embodiment of a front side mold 450 configured as a unitary structure. The front side mold 450 is shown coupled to the fitting 200 on the front side 118 of the panel 114. The unitary mold body 402 in FIG. 14 may be configured similar to the assembled mold body 402 described above and illustrated in FIGS. 6-13. The mold body 402 may include an injection hole 420 to facilitate the injection of seal 300 and a mold cavity 416. The vent hole 422 may allow for the escape of air 314 from the mold cavity 416 to minimize the formation of voids in the seal 300 as indicated above.

Figure 15:
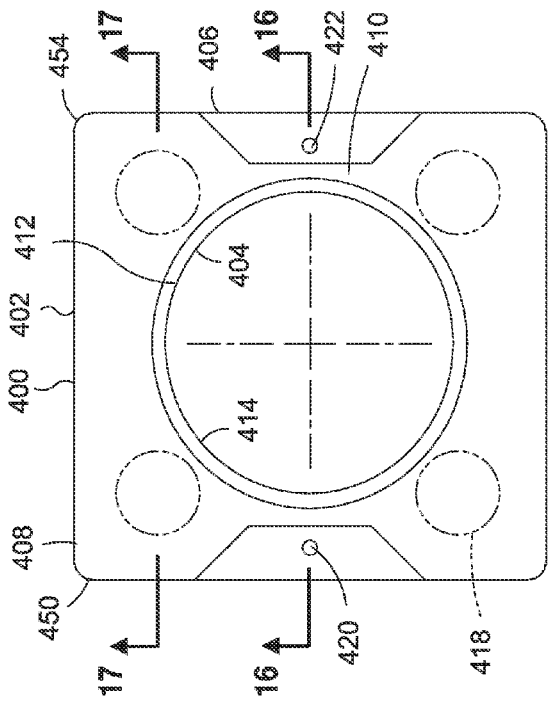
FIG. 15 is a top view of the mold body of FIG. 14.
Figure 16:
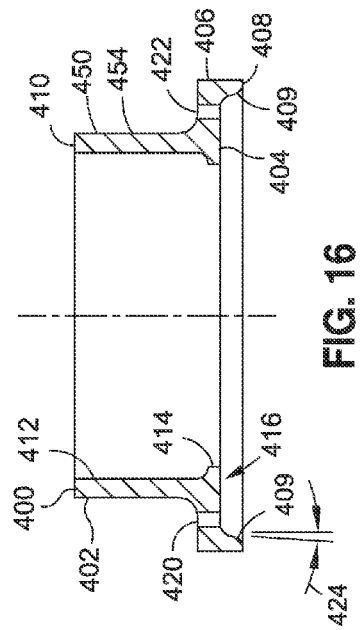
FIG. 16 is a sectional view of the mold body taken along line 16 of FIG. 15.
Figure 17:
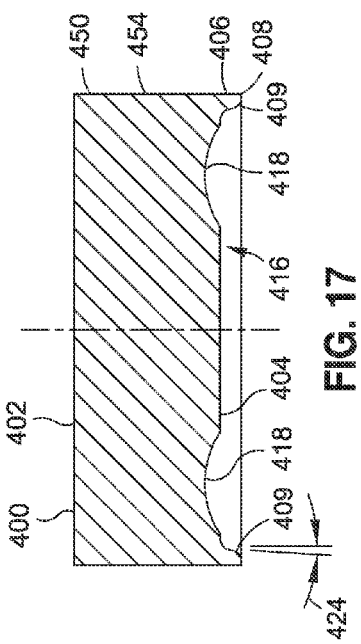
FIG. 17 is a sectional view of the mold body taken along line 17 of FIG. 15.

FIG. 15 is an end view of the mold body 402 illustrating the relative positions of the injection hole 420 and the vent hole 422 on opposite sides of the mold body 402. FIG. 16 is a sectional view of the unitary mold body 402 that may be implemented for use as a front side mold 450 and showing the arrangement of the injection hole 420 and vent hole 422 in illustrating the radial lip 414 for engaging the fitting body 226. FIG. 17 is a sectional view of the mold body 402 illustrating the arrangement of the depressions 418 for accommodating the flange fasteners 234 as described above. The draft angle 424 may also be formed on the mold base to assist in separating the mold body 402 from the seal 300. In FIGS. 16-17, the perimeter edge 409 may include an edge radius 409 on the mold inner geometry 404 such that the seal fillet 313 (FIGS. 2-3) is formed around a perimeter edge 310 of the seal 300 as described above.

FIG. 18 is a side view of a pair of mold bodies 402 assembled around a fitting 200 mounted to a panel 114. The mold bodies 402 include a front side mold 450 and a backshell mold assembly 454. As indicated above, backshell mold assembly 454 may be comprised of one or more mold body portions 440 that may be assembled over the fitting 200. Although shown as a unitary structure, the front side mold 450 may also be comprised of a plurality of mold body portions 440 such as a pair of mold body halves 444 that may be interlocked together over the fitting 200 on the front side 118 of the panel 114. In any of the embodiments disclosed herein, the mold body 402 may be designed and fabricated for a given fitting (e.g., connector) size and configuration. In addition, each mold body 402 may be configured to be mounted to a given side (i.e., panel front side 118 or panel back side 120) of the fitting installation.

In FIGS. 6-17, the mold body 402 or mold body portions 440 may be formed of a mold material such as a polymeric mold material. For example, the mold body 402 may be formed of polytetrafluoroethylene (PTFE) or Teflon™ which may advantageously provide a smooth surface finish on the seal 300 without the need for a release agent for removing the mold body 402 from the seal 300 following cure. Alternatively, the mold body 402 may be formed of a synthetic polyamide material such as Nylon™ which may require the use of a release agent for removal of a mold body 402 following cure of the seal 300. The surface finish provided by a Nylon™ mold body 402 may be less favorable than the surface finish provided by a Teflon™ mold body 402. In another embodiment, the mold body 402 may be formed of ultra-high molecular weight polyethylene which may advantageously be provided at relatively low cost. Additionally, the mold body 402 may be formed of low density polyethylene or other polymeric material. However, the mold body 402 baby formed of any maternal and is not limited polymeric material. For example, the mold body 402 may be formed of metallic material, ceramic material, or any one of a variety of other materials or combinations thereof.

FIG. 19 is an end view of the front side mold 450 mounted to the fitting 200 and the panel 114. The radial lip 414 of the front side mold 450 may be configured to sealingly engage the front portion 206 of the fitting 200. The mold body 402 may be configured such that the radial lip 414 engages a non-threaded portion 209 of the fitting 200. Likewise, the radial lip 414 of the backshell mold assembly 454 may be configured to sealingly engage the back portion 210 of the fitting 200 on a non-threaded portion 209 thereof. For example, the radial lip 414 of the backshell mold assembly 454 may be positioned between a raised fitting feature 218 and the panel 114. In any embodiment disclosed herein, the radial lip 414 may be omitted and the mold bore 412 may be configured to engage any portion of the fitting 200 for enclosing the mold cavity 416.

FIG. 20 is a sectional view of the mold bodies 402 assembled to the fitting 200 and panel 114. The mold cavity 416 for the front side mold 450 may be defined or enclosed by the panel surface 116, the mold inner geometry 404, and the fitting outer geometry 228. FIG. 20 illustrates the injection of sealant 316 into an injection hole 420 on the front side mold 450. The sealant 316 may comprise a one-part sealant or a two-part sealant. For example, a one-part sealant may comprise a room temperature vulcanization (RTV) sealant such as RTV silicone sealant although the sealant 316 may be provided any one of a variety of compositions. A two-part sealant may be mixed prior to injection into the mold cavity 416. The sealant 316 (e.g., one-part or two-part sealant 316) may be injected into the mold cavity 416 such as by using a sealant gun to inject the sealant 316 under pressure. The injected sealant 316 may displace air 314 which may escape out of one or more vent holes 422. Sealant 316 may be continuously injected into the injection hole 420 until the sealant 316 starts flowing out of the vent hole 422 which may provide an indication that the mold cavity 416 is substantially filled with sealant 316.

FIG. 21 is an end view of the backshell mold assembly 454 mounted around the fitting 200 and engaging the panel 114. As indicated above, the radial lip 414 of the backshell mold assembly 454 may be configured to sealingly engage the back portion 210 of the fitting 200 such as along a non-threaded portion 209. However, the radial lip 414 may be omitted and the mold body 402 may rely on the mold bore 412 to sealingly engage the fitting 200 and provide closure for the mold cavity 416.

FIG. 22 is a sectional view of the backshell mold assembly 454 mounted around the fitting 200 and engaging the panel 114. The mold cavity 416 may be defined or enclosed by the panel surface 116, the mold inner geometry 404, and the fitting outer geometry 228 including the fitting flange 232 and the flange fasteners 234. FIG. 22 further illustrates the injection of sealant 316 into the injection hole 420 on the backshell mold assembly 454 and the escape of air 314 and/or sealant 316 from the vent hole 422.

FIG. 23 is a side view of the front side mold 450 and backshell mold assembly 454 clamped to the fitting 200 and the panel 114 using one or more straps 560. In an embodiment, the straps 560 may comprise tie wraps 562 that may be cinched tightly to secure the mold bodies 402 to the front side 118 and back side 120 of the panel 114. One or more stiffeners 564 may be provided on the outer ends of the backshell mold assembly 454 to provide uniform clamping pressure of the backshell mold assembly 454 against the panel 114. Stiffeners (not shown) may also be provided on the front side mold 450. Although not shown, one or more straps 560 (e.g., tie wraps 562) may be cinched around the outer geometry of mold body portions 440 (e.g., the mold body halves 444) forming the backshell mold assembly 454 to couple the mold body portions 440 together during the injection of sealant 316 and during curing. In a further embodiment, the front side mold 450 may be secured or clamped against the panel surface 116 using a rotatable member (not shown) that may be mounted on the front portion 206 of the fitting 200. The rotatable member may comprise a panel nut, a dust cap, or other threaded member that may be threadably engaged to the threaded portion 208 of the fitting body 226 protruding from the front side 118 of the panel 114.

FIG. 24 is an illustration of an embodiment of a clamping mechanism 566 that may be implemented for clamping the mold body portions 440 against the panel surfaces 116. The clamping mechanism 566 may comprise a mechanical clamp having clamp pads 570 mounted to an elongated member. At least one of the clamp pads 570 may be movable along the elongated member to provide a means for adjusting the spacing between the clamp pads 570.

FIG. 25 illustrates the clamping mechanism 566 in operation. The spacing between the clamp pads 570 may be adjusted to match the distance across the mold bodies 402 on the front side 118 and back side 120 of the panel 114. One or both of the clamp pads 570 may include a pad fitting 568 that may allow for swiveling of the clamp pad 570 to accommodate any angular misalignment of mold bodies 402. In this manner, the clamping mechanism 566 may non-eccentrically clamp the mold bodies 402 against the panel surfaces 116 in a manner prevent leakage of sealant 316 between the edges of the mold body 402 and the panel surfaces 116. After the mold body portions 440 are clamped together, sealant 316 may be injected into the injection holes 420 and allowed to cure.

FIG. 26 illustrates a magnetic coupling system 540 for clamping the mold bodies 402 against the panel 114. The magnetic coupling system 540 may include at least one magnet 542 fixedly coupled to a mold body 402 for urging the mold body 402 against the panel surface 116. However, each mold body 402 may include a plurality of magnets 542. For example, each mold body 402 may include a pair of magnets 542 mounted on opposite sides of the mold body 402 to provide uniform pressure to clamp the mold body 402 against the panel surface 116. In an embodiment, the mold body 402 may include at least one magnet post 452 extending outwardly from the mold body 402. The magnet 542 may include a corresponding number of magnet bores 544 configured to receive the magnet posts 452 for removably coupling the magnet 542 to the mold body 402.

FIG. 27 illustrates a further embodiment of the magnetic coupling system 540 including a clamp 546 configured to be clamped around a mold body 402. The clamp 546 may comprise a pair of clamp halves that may be mechanically fastened together using clamp fasteners 550 and assembled around the fitting 200. The clamp 546 may be clamped in a non-slip-fit manner around the mold body 402, or in a slip-fit manner around the mold body 402. One or more magnets 542 may be mechanically fastened or adhesively bonded to the clamp 546 such as on an underside of the clamp 546. In addition to supporting the magnets 542, the clamp 546 may also function as a device for securing the mold body portions 440 (e.g., the mold body halves 444) around the mold body 402. Alternatively, the clamp 546 may be formed of magnetically-attractable material and the magnets 542 may be magnetically coupled to the clamp 546. Even further, the clamp 546 and magnet 542 may be formed as a unitary piece (not shown) of magnetic material that may be removably coupled to the mold body 402. The clamp 546 may include a clamp injection hole 548 that may be aligned with an injection hole 420 in the mold body 402 to allow for injecting sealant 316 into the mold cavity 416.

FIG. 28 is a side view of the magnetic coupling system 540 urging the mold bodies 402 against the panel 114. On the front side 118 of the panel 114, the magnets 542 are engaged to the magnet posts 452 extending outwardly from the mold body 402. On the back side 120 of the panel 114, the magnets 542 may be mechanically and/or adhesively bonded to a clamp 546 which may be removably clamped to the mold body 402 in a non-slip-fit arrangement. Alternatively, the clamp 546 may provide a slip fit around the mold body 402, and the mold body 402 may include a step feature (not shown) to allow the clamp 546 for the urging the mold body 402 against the panel 144 in response to the magnetic coupling of the magnets 542. In FIG. 28, the one or more magnets 542 on the front side 118 of the panel 114 may be configured to magnetically couple with one or more magnets 542 on the back side 120 of the panel 114. Alternatively, the one or more magnet 542 on each side of the panel 114 may be configured to magnetically couple with the panel 114 if the panel 114 includes or contains magnetically attractable material.

FIG. 29-32 illustrate a further embodiment of the seal molding system 400 configured to accommodate fittings 200 with rotatable fitting features 218. FIG. 29 illustrates an embodiment of a fitting 200 (e.g., an electrical connector 202) having a rotatable hex nut 220 threadably engaged to the fitting 200 on the backshell 212. A seal 300 encapsulates the rotatable hex nut 220 and seals the fitting flange 232 to the panel 114.

FIG. 30 illustrates an embodiment of the seal molding system 400 configured as a rotatable mold assembly 500. The rotatable mold assembly 500 has a mold body 402 with a rotatably adjustable top portion 518 coupled to a fixed base portion 502. The fixed base portion 502 has a base portion inner geometry 504 that may be configured complementary to the fitting base 230. For example, the base portion 502 may have a base portion inner geometry 504 that is configured complementary to the square-shaped fitting flange 232 shown in FIG. 21. The rotatably adjustable top portion 518 may be mountable on top of the fixed base portion 502 and may have a top portion inner geometry 520 configured complementary to the fitting feature 218. The top portion 518 may have the top portion inner geometry 520 that is configured complementary to the geometry of the rotatable fitting feature 218 mounted on the fitting body 226. For example, the rotatable fitting feature 218 may comprise a hex-shaped nut 220 that may be threadably engaged to the fitting body 226 as shown in FIG. 29. The rotatably adjustable top portion 518 may be rotated relative to the fixed base portion 502 to allow for clocking the top portion inner geometry 520 into alignment with the angular orientation of the fitting feature 218 (e.g., hex nut 220) on the fitting body 226.

FIG. 31 is an exploded view of an embodiment of the rotatably adjustable top portion 518 and fixed base portion 502. Although the top portion 518 and the base portion 502 may each configured as a unitary structure, FIG. 31 illustrates an embodiment wherein the rotatably adjustable top portion 518 is comprised of a pair of top portion halves 522 that are engageable to one another and formed complementary to the fitting outer geometry 228. Each one of the top portion halves 522 may include a pair of clamping posts 508 on opposing terminal ends 510 of the top portion halves 522 for clamping the top portions halves 522 together. Likewise, the fixed base portion 502 may be comprised of a pair of base portion halves 506 that may be engageable to one another to encapsulate a rotatable fitting feature 218 that may be mounted on the fitting 200. Each one of the top portion halves 522 may include a pair of clamping posts 508 located on opposing terminal ends 510 of the top portion halves 522 for clamping the top portion halves 522 together.

In FIG. 31, the fixed base portion 502 and the rotatably adjustable top portion 518 may additionally include an alignment feature 512 for maintaining axial alignment of the base portion 502 and the top portion 518 during relative rotation thereof. For example, the alignment feature 512 may comprise one or more alignment bosses 514 extending upwardly from the base portion 502 or base portion halves 506 and which may be configured to be receivable within a radial groove 524 that may be formed in the top portion 518 or top portion halves 522. However, the alignment feature 512 may be provided in any one of a variety of different sizes, shapes, and configurations for maintaining the axial alignment of the top portion 518 with the base portion 502. For example, one or more of the clamping posts 508 of the base portion 502 may be configured to extend through the radial grooves 524 formed in the top portion 518 for maintaining the alignment of the top portion 518 with a base portion 502. Once the clocking orientation of the top portion 518 is adjusted relative to the base portion 502, the top portion 518 may be secured to the base portion 502. For example, one or more mechanical fasteners may be extended through the radial grooves 524 and into one or more base portion bores 516 formed in the base portion 502, although other means may be implemented for securing the top portion 518 to the base portion 502.

FIG. 32 is a perspective view of an underside of the base portion 502 and showing the top portion 518 coupled thereto. Advantageously, the base portion 502 may be contoured complementary to the panel surface 116 to which the base portion 502 may be mounted. In the embodiment shown, the base portion 502 may have radiused edges for nesting or mating within a corresponding radius formed in a panel 114 to which the base portion 502 may be coupled FIG. 33 is an exploded view of an embodiment of the seal molding system 400 configured for forming a preformed seal 470 on a fitting 200. The preformed seal 470 may be formed or molded onto the fitting 200 prior to the fitting 200 being attached to the panel 114. In the embodiment shown, the seal molding system 400 may include a bottom plate 474 that may be configured complementary to the fitting flange 232 of the fitting 200. The bottom plate 474 may be configured to be mated to or assembled with an underside of the fitting flange 232. The mold body 402 may have a mold body 402 inner geometry and may be configured complementary to the fitting outer geometry 228 as described below.

In FIG. 33, in an embodiment, the mold body 402 or mold body portions 440 may include one or more port-forming posts 472 for forming an injection port 488 and/or a vent port 490 in a perimeter edge 310 of the preformed seal 470. As described below, the injection port 488 may allow for the injection of adhesive or sealant 316 along the perimeter edge 310 of the preformed seal 470 to facilitate bonding and sealing of the perimeter edge 310 to the fitting 200 and to the panel 114 to which the fitting 200 may be mounted. In a further embodiment, the bottom plate 474 may include a ridge 476 configured to extend around the perimeter of the fitting flange 232 when the bottom plate 474 is mated thereto. The ridge 476 may be configured such that a seal groove 312 is formed along a perimeter edge 310 of the preformed seal 470 to facilitate bonding and sealing of an outer surface of the perimeter edge 310 to the panel 114 after the fitting 200 is mounted to the panel 114.

In FIG. 34, the mold body 402 may be assembled around the fitting body 226 and mated to the bottom plate 474 to encapsulate the fitting flange 232 and define the mold cavity 416. Flange fasteners 234 may be extended through the bottom plate 474 and and/or threadably engaged to the fitting flange 232 to prevent sealant 316 from occupying threaded bores, nut plates, or other threaded receptacles associated with the fitting flange 232. The mold body 402 may be formed as a unitary mold as shown in FIGS. 14-16, or the mold body 402 may be comprised of a pair of mold body halves 444 assembled together as shown in FIGS. 6-13. Sealant 316 may be injected into an injection hole 420 formed in the mold body 402 to form the preformed seal 470 in a manner similar to that described above for forming a seal 300 on a fitting 200 mounted to a panel 114.

In FIGS. 35-36, shown are bottom and top views of the preformed seal 470 following the removal of the bottom plate 474 and removal of one of the mold body portions 440. The preformed seal 470 is shown molded over the fitting flange 232 and sealed around the fitting body 226. Mechanical fasteners in the fitting flange 232 may be removed following the molding process. One or more injection ports 488 and vent ports 490 may be formed in the preformed seal 470 along the perimeter edge 310 thereof as described below.

FIG. 37 is an enlarged view of a portion of the preformed seal 470 illustrating the formation of an injection port 488 in the perimeter edge 310 of the preformed seal 470. The injection port 488 may be formed as a result of a port-forming post 472 that may be included with the mold body 402 as shown in FIG. 33. A vent port 490 may also be formed along the perimeter edge 310 of the preformed seal 470 on an opposite side thereof. Also shown is a seal groove 312 which may be formed along the perimeter edge 310 of the preformed seal 470 as a result of the ridge 476 that may be included in the bottom plate 474. The injection port 48, the vent port 490, and the seal groove 312 may facilitate the sealing or bonding of the perimeter edge 310 to a panel 114 following the mounting of the fitting 200 to the panel 114.

FIG. 38 is an exploded view of a further embodiment of the seal molding system 400 configured for forming a seal skin 480 that may be separately molded and then later bonded to the fitting 200 and the panel 114. The seal molding system 400 for forming the seal skin 480 may use any one of the above-described mold bodies 402 in combination with a seal skin lower plate 482. The seal skin lower plate 482 may have a lower plate outer geometry 484 configured substantially similar to the fitting outer geometry 228 and the panel surface 116. The seal skin lower plate 482 may include protuberances 486 simulating flange fasteners 234 that may extend upwardly from the fitting flange 232 for attaching a fitting flange 232 to a panel 114. The mold body 402 may include at least one port-forming post 472 for forming an injection port 488 and/or a vent port 490 in the seal skin 480 to facilitate bonding the seal skin 480 to the fitting 200 and the panel 114 similar to that described above for the preformed seal 470.

FIG. 39 illustrates the mold body 402 mated to the seal skin lower plate 482 to define a mold cavity 416 for forming the seal skin 480 from sealant 316 injected into the mold cavity 416. Sealant 316 may be injected into an injection hole 420 formed in the mold body 402 as described above with regard to the mold bodies 402 illustrated in FIG. 6-17. The mold body 402 may include a vent hole 422 to allow for the escape of air 314 and sealant 316 once the mold cavity 416 is substantially filled. FIG. 40 illustrates the removal of the mold body 402 from the seal skin lower plate 482 to reveal the cured seal skin 480.

FIGS. 41-42 illustrate the seal skin 480 after removal thereof from the seal skin lower plate 482 for later bonding to a fitting 200 as may be installed on a panel 114. The seal skin 480 may include bulges 308 at the locations of the protuberances 486 in the seal skin lower plate 482 and depressions 418 in the mold body 402. In this regard, the lower plate outer geometry 484 and the mold body 402 provide a means for forming the seal skin 480 at any desired wall thickness 306 along any location of the seal skin 480 as shown in FIG. 43.

Figure 44:
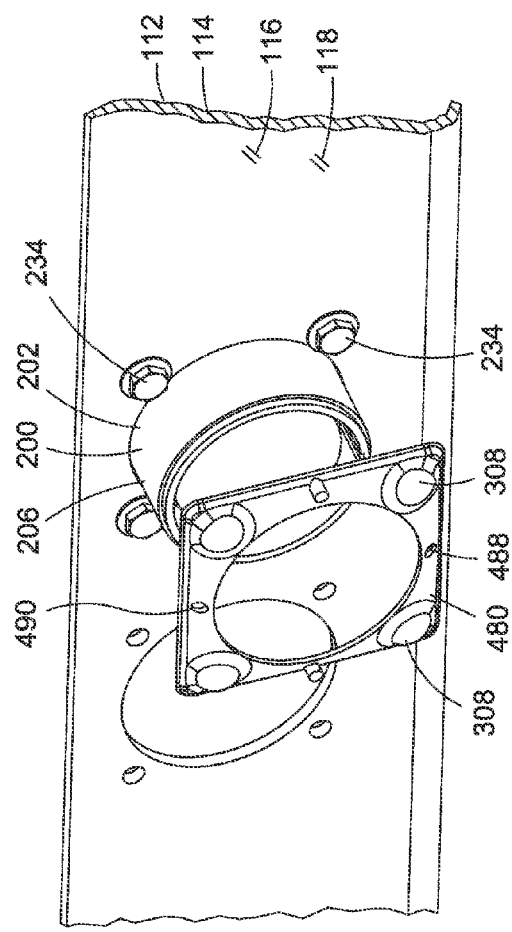
FIG. 44 is a perspective illustration of the seal skin prior to application thereof onto a fitting mounted to a panel.

FIGS. 43-44 illustrate the installation of the seal skin 480 to a front portion 206 of a fitting 200 mounted to a panel 114. The seal skin 480 may be positioned such that the bulges 308 in the seal skin 480 are aligned with the flange fasteners 234. After positioning the seal skin 480 on the fitting 200, sealant 316 or adhesive may be injected into the injection port 488 in the seal skin 480 to bond the seal skin 480 to the panel 114 and the flange fasteners 234. Alternatively, prior to the cured seal skin 480 being installed, sealant 316 may initially be manually applied over the fitting flange 232 and flange fasteners 234 securing the fitting 200 to the panel 114. The cured seal skin 480 may then be installed over the sealant 316 by manually pushing the seal skin 480 into place such that the perimeter edge 310 of the seal skin 480 is sealed to the panel surface 116. In this manner, the seal skin 480 provides a top surface that is cured and smooth. Any squeeze-out of sealant 316 from underneath the seal skin 480 may be cleaned up to complete the installation. Although not shown, a seal skin may also be formed in multiple seal skin portions (not shown) that may be assembled and bonded to the fitting body and/or fitting flange that may be mounted to a panel 114 using a system similar to that described above with regard to the unitary seal skin 480 shown in FIGS. 38-43.

Figure 46:
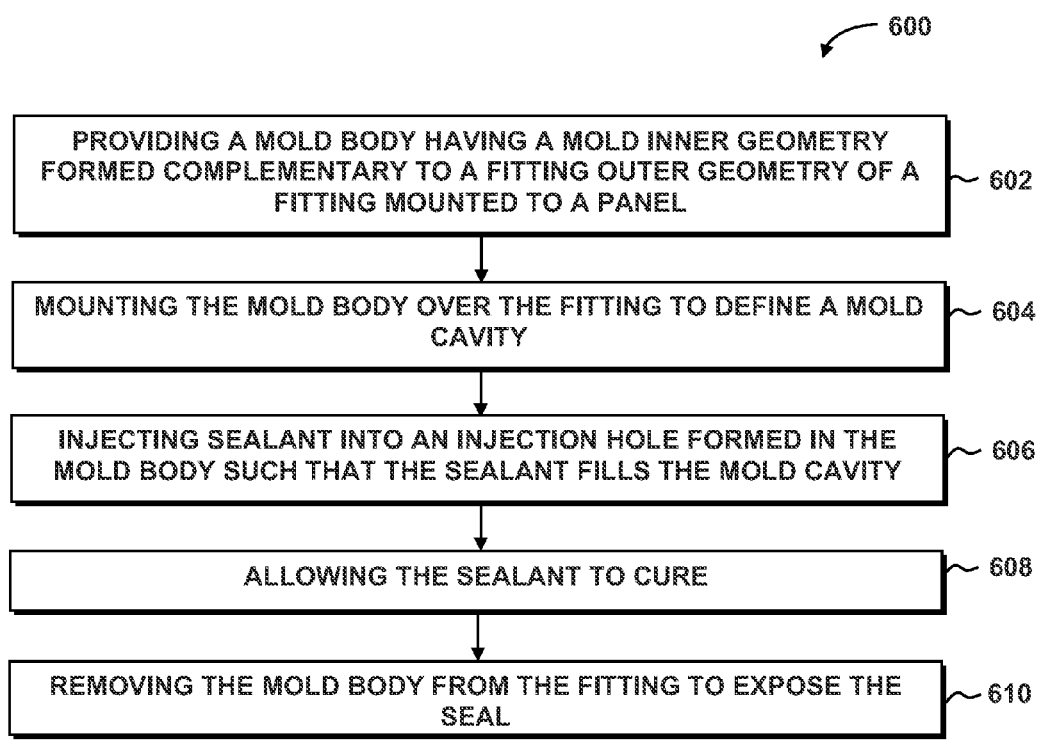
FIG. 46 is a flow diagram of a method of molding a seal over a fitting mounted to a panel.

Referring to FIG. 46 with additional reference to FIGS. 4-25, shown in FIG. 46 is an embodiment of a method 600 of molding a seal 300 onto a fitting 200 mounted to a panel 114. Step 602 of the method 600 may include providing a mold body 402 having a mold inner geometry 404 and/or a mold bore 412. As indicated above, the mold body 402 may be provided as a pair of mold body halves 444, each of which may include a bore portion 442 and which may be configured to be assembled around a fitting 200. For example, the mold body halves 444 may be configured as mirror images of one another as shown in FIG. 7. In an embodiment, the method may include coupling the mold body halves 444 together using interlocking features 446 formed on the terminal ends of the mold body halves 444. The mold inner geometry 404 may be formed complementary to a fitting outer geometry 228 of a fitting 200 mounted to a panel 114.

Step 604 of the method 600 of FIG. 46 may include mounting the mold body 402 over the fitting 200. The mold body 402 may be coupled to the panel 114 and the fitting 200 by means of one or more tie wraps 562, a clamping mechanism 566, or other mechanism for clamping the mold bodies 402 to the panel 114 such that each mold base 406 is sealingly engaged with the panel surface 116 and the fitting body 226. The mold base 406 may be formed complementary to a panel surface 116 to improve the sealing engagement of the mold body 402 to the panel 114. In this regard, the step of mounting the mold body 402 over the fitting 200 such that the mold base 406 is sealingly engaged with the panel surface 116 may include mounting at least one magnet 542 to the mold body 402, and magnetically coupling the magnet 542 to the panel 114 and/or to an additional magnet 542 located on an opposite side of the panel 114 and which may be coupled to an additional mold body 402. The magnets 542 may maintain the mold body 402 against the panel surface 116 in response to the magnetic coupling.

Step 606 of the method 600 of FIG. 46 may include injecting sealant 316 into an injection hole 420 formed in the mold body 402. As indicated above, sealant 316 may be continuously injected into the mold cavity 416 until the sealant 316 substantially fills the mold cavity 416 and the sealant 316 starts flowing out of a vent port 490 as an indication that the mold cavity 416 is substantially filled with sealant 316. The vent hole 422 may allow air 314 to escape while sealant 316 is injected into the mold cavity 416 which may minimize or eliminate the occurrence of voids or air pockets in the cured seal 300.

Step 608 of the method 600 of FIG. 46 may include allowing the sealant 316 to cure inside the mold cavity 416. As indicated above, the sealant 316 may comprise a one-part sealant, a two-part sealant, or other sealant compositions. In an embodiment, the sealant may comprise an RTV sealant such as a silicone sealant. However, any sealant 316 may be injected into the mold cavity 416 to form a seal 300 that may act as a barrier against fluid transfer, or which may prevent moisture ingress between the fitting flange 232 and panel 114, or into the flange fasteners 234.

Step 610 of the method 600 of FIG. 46 may include removing the mold body 402 from the fitting 200 and/or the panel 114 after the seal 300 is cured. In an embodiment, the mold body 402 may be formed of a material that may facilitate release of the mold inner geometry 404 from the seal 300. Mold release may be pre-applied to the mold body 402 to facilitate removal of the mold body 402. Removal of the mold body 402 may be further facilitated by providing a draft angle 424 on the mold inner geometry 404.

Figure 47:
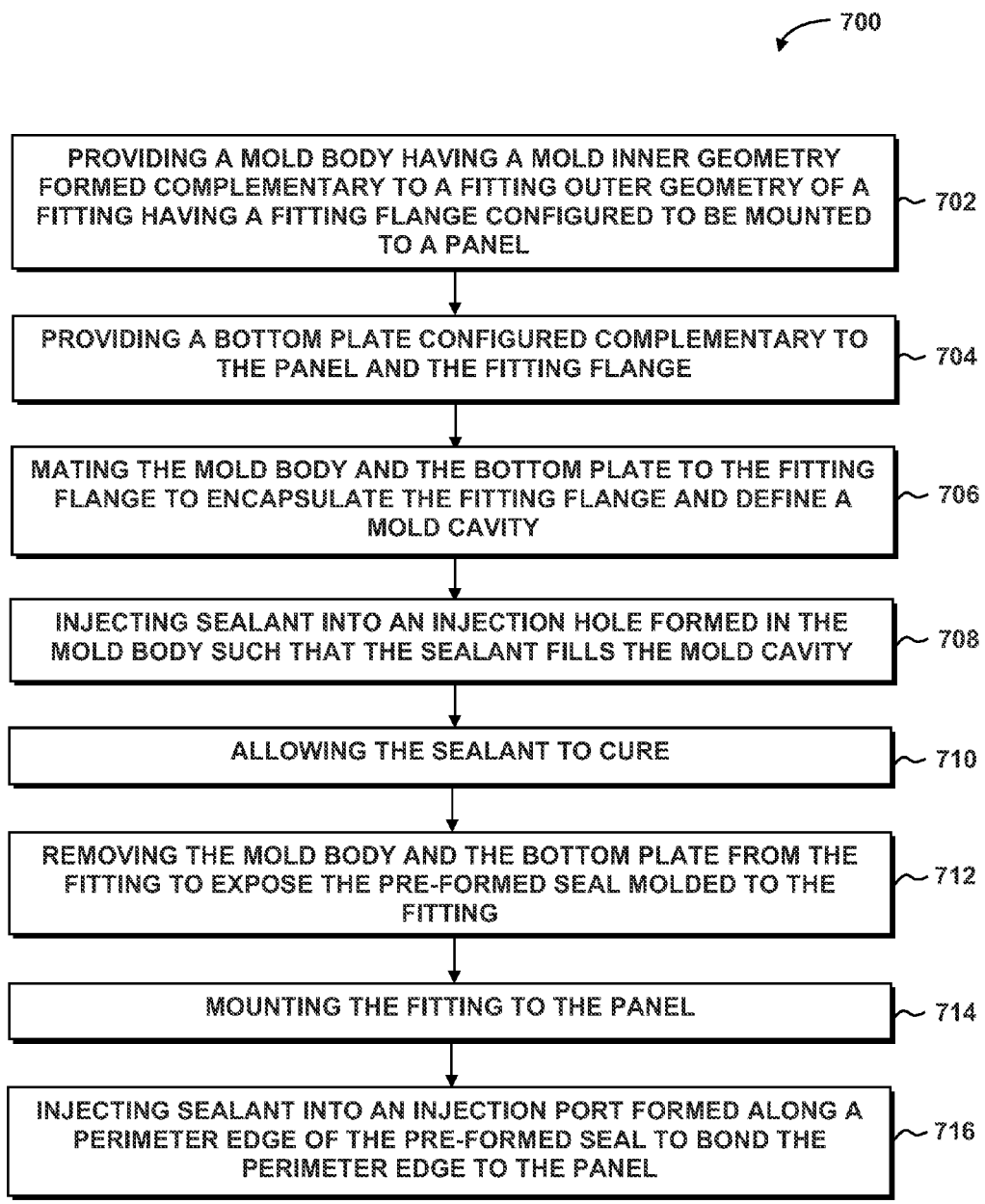
FIG. 47 is a flow diagram of a method of molding a preformed seal over a fitting subsequently mounted to a panel.

In FIG. 47 with additional reference to FIGS. 33-37, shown in FIG. 47 is an embodiment of a method 700 of forming a preformed seal 470 around a fitting 200 configured to be mounted to a panel 114. The method may include Step 702 of providing a mold body 402 as described above and having a mold inner geometry 404 and a mold bore 412 formed complementary to a fitting outer geometry 228 of a fitting 200 having a fitting flange 232 configured to be mounted to a panel 114. The method may include providing the mold body 402 with at least one port-forming post 472, and forming, using the port-forming post 472, an injection port 488 and/or a vent port 490 in a perimeter edge 310 of the preformed seal 470 to provide a means for injecting adhesive or sealant 316 along the perimeter edge 310 of the preformed seal 470 for bonding and sealing the perimeter edge 310 to the panel 114.

Step 704 of the method 700 of FIG. 47 may include providing a bottom plate 474 configured complementary to the panel 114 and the fitting flange 232. An embodiment of a bottom plate 474 is shown in FIG. 33. The method may include providing the bottom plate 474 with a ridge 476 configured to extend around the fitting flange 232 when the bottom plate 474 is mated thereto. In this regard, the method may include configuring the ridge 476 to form a seal groove 312 along the perimeter edge 310 of the preformed seal 470 to facilitate the bonding and sealing the perimeter edge 310 to the panel 114.

Step 706 of the method 700 of FIG. 47 may include mating or coupling the mold body 402 and the bottom plate 474 to the fitting flange 232. The mold body 402, the bottom plate 474, and the fitting flange 232 may encapsulate the fitting flange 232 and form the mold cavity 416. Flange fasteners 234 may be installed in the fitting flange 232 holes to prevent sealant 316 from clogging the fastener holes (not shown).

Step 708 of the method 700 of FIG. 47 may include injecting sealant 316 into an injection hole 420 formed in the mold body 402 until the sealant 316 substantially fills the mold cavity 416 and the sealant 316 flows out of a vent port 490 formed in the mold body 402. As indicated above, sealant 316 flowing out of the vent port 490 may provide an indication that the mold cavity 416 is substantially filled. The vent port 490 may also allow air 314 to escape. Step 710 may include allowing the sealant 316 to cure.

Step 712 of the method 700 of FIG. 47 may include removing the mold body 402 and the bottom plate 474 from the fitting 200 to expose the preformed seal 470. The preformed seal 470 may be permanently molded to the fitting 200. Step 714 may include mounting the fitting 200 to the panel 114. Step 716 of the method may include injecting sealant 316 into an injection port 488 formed along a perimeter edge 310 of the preformed seal 470 as a means to bond the perimeter edge 310 to the panel 114.

Figure 48:
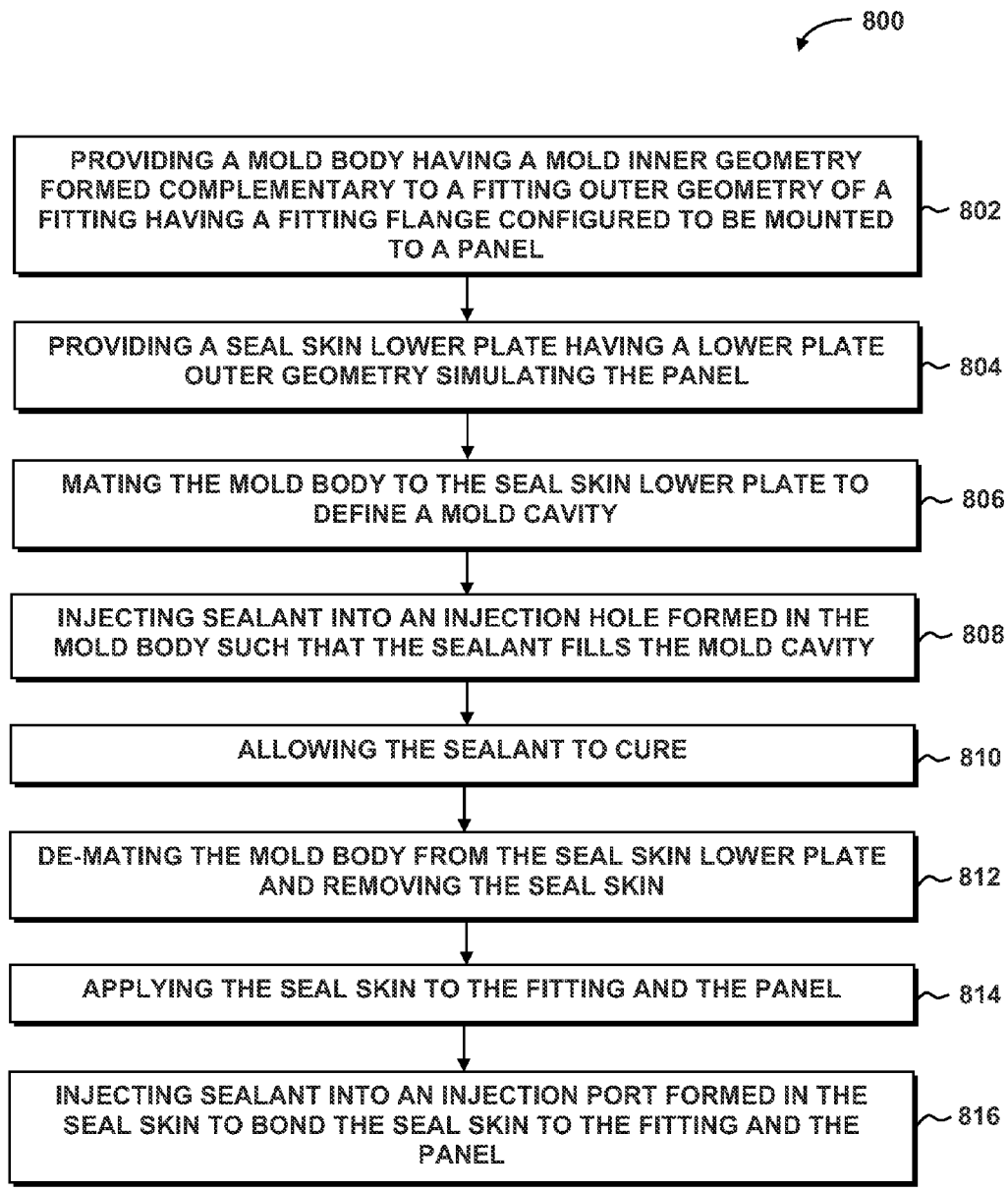
FIG. 48 is a flow diagram of a method of molding a seal skin for subsequent bonding to a fitting and a panel.

In FIG. 48 with additional reference to FIGS. 38-43, shown in FIG. 48 is an embodiment of a method 800 of forming a seal skin 480 for sealing a fitting 200 mounted to a panel 114. The method may include Step 802 comprising providing a mold body 402 having a mold inner geometry 404 and a mold bore 412 formed complementary to a fitting outer geometry 228 of a fitting 200 having a fitting flange 232 configured to be mounted to a panel 114. The method may further include providing the mold body 402 with at least one port-forming post 472, and forming, using the port-forming post 472, an injection port 488 and/or a vent port 490 in the seal skin 480 to facilitate bonding the seal skin 480 to at least one the and the panel 114 in a manner described above for the preformed seal 470.

Step 804 of the method 800 of FIG. 38 may include providing a seal skin lower plate 482 having a lower plate outer geometry 484 simulating or being substantially similar to the fitting outer geometry 228 and a panel surface 116. The method may include forming at least one protuberance 486 in the seal skin lower plate 482 to simulate a flange fastener 234 that may protrude outwardly form the fitting flange 232 for attaching the fitting 200 to the panel 114.

Step 806 of the method 800 of FIG. 38 may include mating the mold body 402 to the seal skin lower plate 482 to define a mold cavity 416 as shown in FIG. 39. Step 808 of the method 800 may include injecting sealant 316 into an injection hole 420 formed in the mold body 402 until the sealant 316 substantially fills the mold cavity 416 and the sealant 316 flows out of a vent port 490 formed in the mold body 402. Step 810 of the method 800 may include allowing the sealant 316 to cure.

Figure 45:
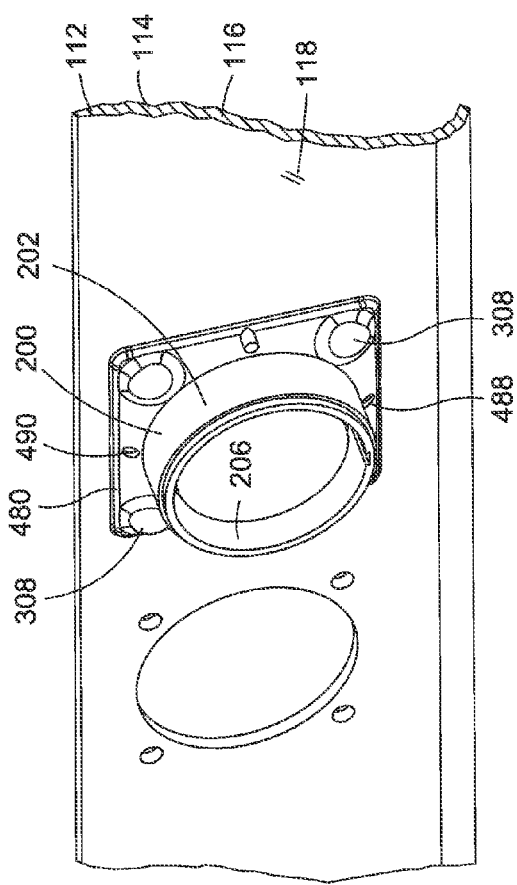
FIG. 45 is a perspective illustration of the seal skin after bonding to the fitting and the panel.

Step 812 of the method 800 of FIG. 38 may include removing the seal skin 480 from the mold body 402 and the seal skin lower plate 482 as shown in FIGS. 41-42. Step 814 of the method 800 may include applying the seal skin 480 to the fitting 200 and the panel 114 as shown in FIGS. 44-45. Step 816 of the method 800 may include bonding the seal skin 480 to a fitting 200 installed on a panel 114 by injecting sealant 316 into an injection port 488 formed in the seal skin 480 to bond the seal skin 480 to the fitting 200 and the panel 114.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming a seal around a fitting mounted to a panel, comprising:
   providing a pair of mold body halves configured to be assembled around a fitting along mold parting lines and having a mold inner geometry formed complementary to a fitting outer geometry of the fitting mounted to a panel, the fitting having a fitting axis normal to the panel;
   mounting the mold body over the fitting;
   coupling the mold body halves together when assembled around the fitting using an interlocking tab and pocket formed into the mold parting lines on opposite circumferential ends of each one of the mold body halves, each mold parting line including a pair of axial portions oriented parallel to the fitting axis and interconnected by an angled portion oriented non-perpendicular to the axial portions, the axial portions and the angled portion collectively defining a Z-shape in the mold parting line when the coupled mold body halves are viewed from a side direction oriented perpendicular to the fitting axis and looking onto the mold parting line;
   injecting sealant into an injection hole formed in the mold body until the sealant substantially fills a mold cavity enclosed by the mold inner geometry and the fitting outer geometry;
   allowing the sealant to cure; and
   removing the mold body from the fitting.

2. The method of claim 1, further comprising:
   providing the mold body halves as mirror images of one another.

3. The method of claim 1, wherein:
   the mold body halves include a radial lip to facilitate sealing against the fitting body.

4. The method of claim 1, wherein:
   the mold body halves include side walls having a draft angle facilitating the removal of the mold body halves from the seal.

5. The method of claim 1, further including:
   clamping the mold body halves to the panel and the fitting using at least one of the following: a tie wrap, a clamping mechanism, a magnet.

6. The method of claim 1, wherein:
   the sealant is a room temperature vulcanization sealant.

7. A method of forming a seal around a fitting, comprising:
   providing a mold body having a mold inner geometry formed complementary to a fitting outer geometry of a fitting configured to be mounted to a panel;
   providing a bottom plate configured complementary to the fitting flange and the panel;
   mating the bottom plate to the fitting flange;
   coupling the mold body to the bottom plate to encapsulate the fitting flange and form a mold cavity for receiving sealant for forming a preformed seal; and
   injecting sealant into an injection hole formed in the mold body until the sealant substantially fills a mold cavity enclosed by the mold inner geometry and the fitting outer geometry;
   allowing the sealant to cure to form the seal; and
   removing the mold body and the bottom plate from the fitting.

8. The method of claim 7, further including the steps of:
providing the mold body with at least one port-forming post; and
forming, using the port-forming post, an injection port in a perimeter edge of the preformed seal for injecting adhesive or sealant along a perimeter edge of the preformed seal for bonding and sealing the perimeter edge to the panel.

9. The method of claim 7, further including the step of:
forming a seal groove along a perimeter edge of the seal for bonding and sealing the perimeter edge to the panel.

10. The method of claim 9, further including the step of:
providing the bottom plate with a ridge for forming the seal groove along the perimeter edge when sealant is injected into the mold cavity.

11. The method of claim 7, wherein:
the mold body includes a radial lip to facilitate sealing against a fitting body.

12. The method of claim 7, wherein:
the mold body includes side walls having a draft angle facilitating the removal of the mold body from the seal.

13. The method of claim 7, further including:
clamping the mold body to the panel and the fitting using at least one of the following: a tie wrap, a mechanical clamp, a magnet.

14. The method of claim 7, wherein:
the sealant is a room temperature vulcanization sealant.

15. A method of forming a seal skin, comprising:
providing a mold body having a mold inner geometry formed complementary to a fitting outer geometry of a fitting configured to be mounted to a panel;
providing a seal skin lower plate having a lower plate outer geometry simulating the fitting outer geometry and a panel surface of the panel;
mating the mold body to the seal skin lower plate to define a mold cavity for forming a seal skin from sealant injected into the mold cavity;
injecting the sealant into the mold cavity;
allowing the sealant to cure to form the seal skin;
removing the mold body from the seal skin lower plate; and
removing the seal skin from the seal skin lower plate.

16. The method of claim 15, further including the step of:
bonding the seal skin to a fitting installed on a panel.

17. The method of claim 15, further including the step of:
providing the mold body with at least one port-forming post; and
forming, using the port-forming post, an injection port in the seal skin for bonding the seal skin to at least one the fitting and the panel.

18. The method of claim 15, wherein:
the seal skin lower plate includes protuberances simulating flange fasteners for attaching a fitting flange to the panel.

19. The method of claim 15, wherein:
the mold body includes a radial lip to facilitate sealing against a fitting body.

20. The method of claim 15, wherein:
the mold body includes side walls having a draft angle facilitating the removal of the mold body from the seal.

21. The method of claim 15, wherein:
the sealant is a room temperature vulcanization sealant.

* * * * *